United States Patent
Chan et al.

(10) Patent No.: US 11,875,387 B1
(45) Date of Patent: *Jan. 16, 2024

(54) AUTOMATED ACTIONS FOR FACILITATING REMITTING RESOURCES

(71) Applicant: Avalara, Inc., Seattle, WA (US)

(72) Inventors: Andrew Brandon Chan, Chapel Hill, NC (US); Danielle Lear, Denver, CO (US); Brian K. Mason, Castle Rock, CO (US); Andrew Z. Fountain, Seattle, WA (US); Patrick Collins Chesser, Denver, CO (US); Patrick J. Hampton, Littleton, CO (US); David A. Goldstein, Castle Rock, CO (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,504

(22) Filed: May 24, 2022

Related U.S. Application Data

(63) Continuation of application No. 17/028,912, filed on Sep. 22, 2020, now Pat. No. 11,373,222.
(Continued)

(51) Int. Cl.
*G06Q 30/04* (2012.01)
*G06Q 20/14* (2012.01)
(Continued)

(52) U.S. Cl.
CPC ........... *G06Q 30/04* (2013.01); *G06Q 20/145* (2013.01); *G06Q 20/3827* (2013.01);
(Continued)

(58) Field of Classification Search
CPC .... G06Q 30/04; G06Q 40/123; G06Q 20/145; G06Q 20/3827; G06Q 20/405; G06Q 20/407; G06Q 30/0283
(Continued)

(56) References Cited

U.S. PATENT DOCUMENTS

| 7,249,072 B1 * | 7/2007 | Nearhood | G06Q 10/10 |
| | | | 705/31 |
| 7,783,536 B2 | 8/2010 | William et al. | |

(Continued)

OTHER PUBLICATIONS

Bucks, "Airbnb Agreements with State and Local Tax Agencies: A Formula for Undermining Tax Fairness, Transparency and the Rule of Law," Mar. 2017, 59 pages.
(Continued)

*Primary Examiner* — Sara C Hamilton
(74) *Attorney, Agent, or Firm* — Jeremiah J. Baunach; VLP Law Group LLP

(57) ABSTRACT

Systems and methods electronically obtain data regarding a plurality of sources and corresponding amounts of resources received from the sources for a plurality of relationship instances each associated with one or more respective domains of a plurality of domains. For each relationship instance of the plurality of relationship instances: the system electronically identifies a rate to calculate an amount of resource due to one or more respective domains associated with the relationship instance based on a source of a resource received for the relationship instance and the one or more respective domains and calculates an amount of resources due to at least one respective domain associated with the relationship instance based on the identified rate. For each domain of the plurality of domains, the system aggregates a total amount of resources due to the domain based on the calculated amount of resources due for each relationship instance associated with the domain. The system may then prepare and send, via a computer network, a reporting document to a system of the domain indicating the aggregated total amount of resources due.

12 Claims, 13 Drawing Sheets

Related U.S. Application Data

(60) Provisional application No. 63/039,906, filed on Jun. 16, 2020, provisional application No. 63/039,907, filed on Jun. 16, 2020, provisional application No. 63/039,903, filed on Jun. 16, 2020, provisional application No. 62/990,789, filed on Mar. 17, 2020.

(51) Int. Cl.
*G06Q 20/40* (2012.01)
*G06Q 20/38* (2012.01)
*G06Q 30/0283* (2023.01)
*G06Q 40/12* (2023.01)

(52) U.S. Cl.
CPC ......... *G06Q 20/405* (2013.01); *G06Q 20/407* (2013.01); *G06Q 30/0283* (2013.01); *G06Q 40/123* (2013.12)

(58) Field of Classification Search
USPC .......................................................... 705/40
See application file for complete search history.

(56) References Cited

U.S. PATENT DOCUMENTS

| | | | |
|---|---|---|---|
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,719,842 B1 | 7/2020 | Gharavy | |
| 10,769,611 B2 | 9/2020 | McNeel | |
| 2002/0052792 A1* | 5/2002 | Johnson | G06Q 20/207 705/31 |
| 2002/0138765 A1 | 9/2002 | Fishman et al. | |
| 2002/0188535 A1 | 12/2002 | Chao et al. | |
| 2005/0071246 A1 | 3/2005 | Smith et al. | |
| 2007/0136158 A1 | 6/2007 | Rawlings et al. | |
| 2007/0136159 A1 | 6/2007 | Rawlings et al. | |
| 2008/0120129 A1 | 5/2008 | Seubert et al. | |
| 2009/0119193 A1 | 5/2009 | Selleck | |
| 2009/0240541 A1 | 9/2009 | Smith | |
| 2010/0306071 A1* | 12/2010 | Kay | G06Q 40/02 705/19 |
| 2011/0066455 A1 | 3/2011 | Lobo et al. | |
| 2012/0030045 A1* | 2/2012 | Smith, III | G06Q 20/207 705/19 |
| 2012/0197759 A1* | 8/2012 | Neely | G06Q 30/0613 705/26.41 |
| 2013/0013471 A1 | 1/2013 | Fishman | |
| 2013/0317942 A1 | 11/2013 | Cullen, III | |
| 2014/0337180 A1 | 11/2014 | Dvorak et al. | |
| 2014/0337189 A1 | 11/2014 | Barsade et al. | |
| 2014/0379531 A1* | 12/2014 | Huang | G06Q 40/123 705/26.81 |
| 2017/0011377 A1 | 1/2017 | Stone | |
| 2018/0268420 A1 | 9/2018 | Maselli et al. | |
| 2019/0340703 A1 | 11/2019 | West et al. | |
| 2020/0042964 A1 | 2/2020 | Roach et al. | |
| 2021/0049552 A1 | 2/2021 | Dolan et al. | |
| 2021/0233181 A1 | 7/2021 | Bubalo et al. | |

OTHER PUBLICATIONS

Avalara for beverage alcohol now features shipping verification, providing real-time compliance for direct-to-consumer sellers. (Apr. 21, 2021). (Year: 2021).

* cited by examiner

AUTOMATED ACTIONS FOR FACILITATING REMITTING RESOURCES

TECHNICAL FIELD

The technical field relates to computer networks, and particularly to networked automated systems for facilitating remitting resources.

BRIEF SUMMARY

The present description gives instances of computer systems, devices and storage media that may store programs and methods. Embodiments of the system may determine resources according to different digital rules based on a source of a resource received for a relationship instance and one or more respective domains associated with the relationship instance, and facilitate remitting such resources.

In some embodiments, a system for facilitating remitting resources electronically obtains data regarding a plurality of sources and corresponding amounts of resources received from the sources for a plurality of relationship instances each associated with one or more respective domains of a plurality of domains. For each relationship instance of the plurality of relationship instances: the system electronically identifies a rate to calculate an amount of resource due to one or more respective domains associated with the relationship instance based on a source of a resource received for the relationship instance and the one or more respective domains; and calculates an amount of resources due to at least one respective domain associated with the relationship instance based on the identified rate. For each domain of the plurality of domains, the system aggregates a total amount of resources due to the domain based on the calculated amount of resources due for each relationship instance associated with the domain. The system may electronically prepare a reporting document indicating the total amount of resources due to the domain and an amount of resources already remitted to the domain for the plurality relationship instances. The system may then electronically send, via a computer network, the reporting document to a system of the domain.

Providing, in a timely and efficient manner, accurate and reliable determination of resources for datasets according to different digital rules for different sources of a resource received presents a technical problem for current Enterprise Resource Planning (ERP) software applications. This problem is exacerbated when multiple different digital rules must be applied to the same dataset associated with a particular relationship instance in order to remit resources to multiple different domains associated with the particular relationship instance.

The present disclosure provides systems, devices, computer-readable media and methods that solve these technical problems by increasing the speed, efficiency and accuracy of such specialized software platforms and computer networks, thus improving the technology of ERP software applications and accounting applications.

Therefore, the systems and methods described herein for facilitating remitting resources improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate remitting of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
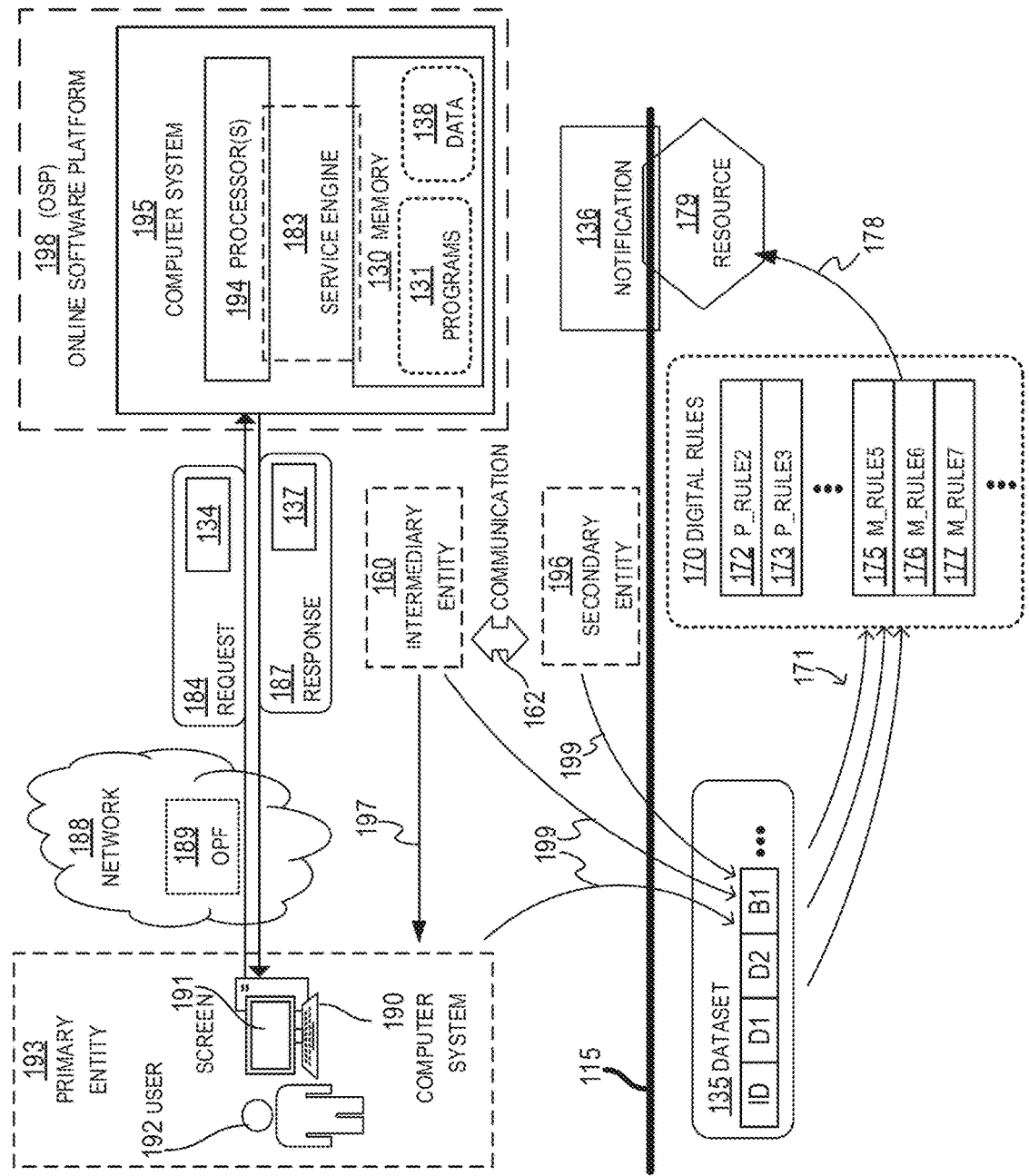
FIG. 1 is a diagram showing sample aspects of embodiments of the present disclosure.

FIG. 1 is a diagram showing sample aspects of embodiments of the present disclosure.

A thick line 115 separates this diagram, although not completely or rigorously, into a top portion and a bottom portion. Above the line 115 the emphasis is mostly on entities, components, their relationships, and their interactions, while below the emphasis is mostly processing of data that takes place often within one or more of the components above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be searches, determinations, computations, verifications, notifications, the transmission of specialized information, including data that effectuates payments or remits resources, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules 170 to the payload 134 to determine a requested resource 179, form a payload 137 that is an aspect of the resource 179, and then push, send, or otherwise cause to be transmitted a response 187 that carries the payload 137 to the connector. The connector reads the response 187, and forwards the payload 137 to the certain application.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have instances of relationships with secondary entities. Only one such secondary entity 196 is shown. However, additional secondary entities may be present in various other embodiments. In this example, the primary entity 193 has a relationship instance 197 with the secondary entity 196 via an intermediary entity 160 using communication 162 between the intermediary entity 160 and the secondary entity 196. For example, the communication 162 between the intermediary entity 160 and the secondary entity 196 may be made over network 188.

In some instances, the user 192, the primary entity 193 and/or the intermediary entity 160 may have data about one or more secondary entities, for example via relationship instances of the user 192 or primary entity with the secondary entity 196. The primary entity 193, the intermediary entity 160, and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196, and/or the intermediary entity 160 as indicated by arrows 199. (It should be noted that the arrows 199 describe a correspondence, but not the journey of data in becoming the received dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of whether the relationship instance 197 with the secondary entity 196 is via the intermediary entity 160, an indication of whether a resource associated with the relationship instance 197 is received via the intermediary entity 160, an indication of an identity or other characteristic of the intermediary entity 160, and so on. The dataset 135 may further have additional such values, as indicated by the horizontal dot-dot-dot to the right of the dataset 135. In some embodiments, the dataset 135 has values that characterize attributes of each of the primary entity 193, the secondary entity 196 and the intermediary entity 160, but that is not required.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE6 176 is thus identified, which is indicated also by the beginning of an arrow 178 that is described in more detail later in this document. Identifying may be performed in a number of ways, and depending on how the digital main rules are implemented. An example is now described.

Figure 2:
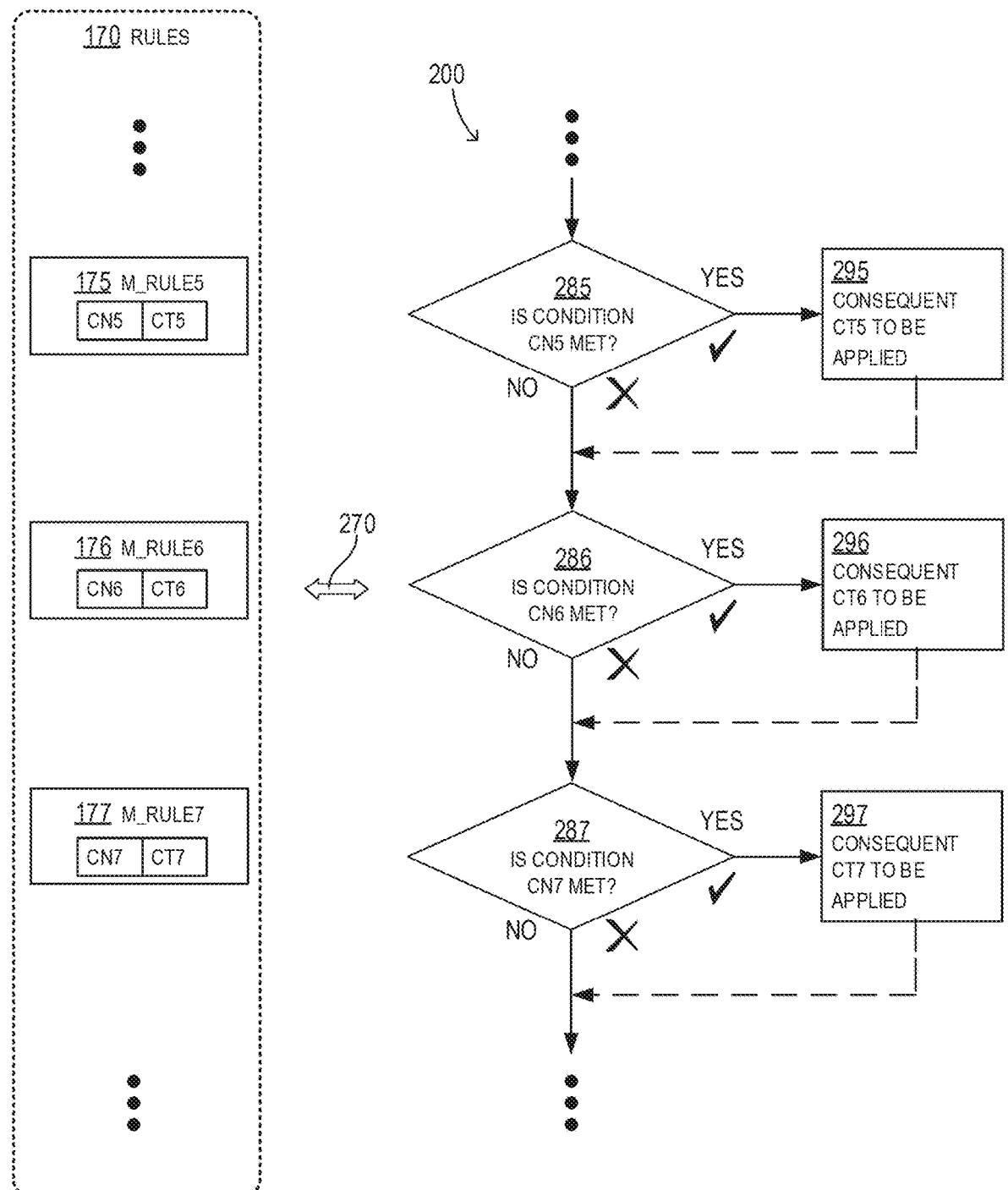
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 27, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE6 176 was thus identified. With reference to FIG. 2, the identification may have happened at operation 286 of the flowchart portion 200, at which time it was recognized that condition CN6 was met by a value of the dataset 135. This made: the condition CN6 be the certain condition, the digital main rule M_RULE6 176 be the certain digital main rule, and the consequent CT6 be the certain consequent of the certain digital main rule M_RULE6 176. And the certain consequent CT6 is associated with the certain condition CN6, since both are included by the certain digital main rule 176. Therefore, according to operation 296, consequent CT6 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 286 may give the answer YES such that consequent CT6 is to be applied, and operation 287 may also give the answer YES such that consequent CT7 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

In embodiments, a resource may be produced for the dataset, by the computer system 195 applying the certain consequent of the certain digital main rule. The resource can be a computational result, a document, an item of value, a representation of an item of value, etc., made, created or prepared for the user 192, the primary entity 193, the secondary entity 196, the intermediary entity 160, etc., on the basis of the attribute. As such, in some embodiments, the resource is produced by a determination and/or a computation. In the example of FIG. 1, a resource 179 is produced for the dataset 135, by the computer system 195 applying the certain M_RULE6 176, and in particular its certain consequent CT6, as indicated by the arrow 178. In fact, sometimes applying the consequent is more simply stated as "applying the rule".

The resource may be produced in a number of ways. For example, the certain consequent can be applied to one of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource. In the example of FIG. 1, a notification 136 can be caused to be transmitted by the computer system 195, for example as an answer or other response to the received dataset 135. The notification 136 can be about an aspect of the resource 179. In particular, the notification 136 may inform about the aspect of the resource 179, namely that it has been determined, where it can be found, what it is, or at least a portion or a statistic of its content, a rounded version of it, and so on. Of course, the planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In an example embodiment, there may be a plurality of relationship instances between the primary entity 193 and one or more secondary entities, such as secondary entity 196. In some embodiments, such relationship instances are between the primary entity 193 and one or more secondary entities, such as secondary entity 196, via one or more intermediary entities, such as intermediary entity 160 using communication 162. Each relationship instance may be associated with one or more respective domains of a plurality of domains. Also, each relationship instance may be associated with one or more respective intermediary entities, such as intermediary entity 160, which handles or facilitates creation of the relationship instance using communication 162. For example, a resource associated with the relationship instance 197 may be received by the primary entity 193 via the intermediary entity 160. In various embodiments, a domain may be a region defined by a boundary as discussed above or may be an entity representing or otherwise associated with the region. For example, the region could be geographic, within the space of a city, a county, a state, a country, a continent or the earth. The plurality of relationship instances may result in a requirement that an electronic reporting document associated with the primary entity 193 be prepared regarding an amount of resources due to one or more of the plurality of domains, that the document be sent to one or more of the plurality of domains and that resources possibly be remitted to one or more of the plurality of domains. The OSP 198 may perform or facilitate such electronic actions.

For example, in one embodiment, primary entity 193 may have a relationship instance with secondary entity 196 and that particular relationship instance may be associated with one or more domains and with the particular intermediary entity 160 through which a resource associated with the relationship instance 197 was received by the primary entity 193 from the secondary entity 196. The association of the relationship instance with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance and/or one or more characteristics of the relationship instance may be defined or represented by values of dataset 135.

In the present example, the OSP 198 may obtain data regarding a plurality of sources and corresponding amounts of resources received from the sources for each of the plurality of relationship instances. An example of a source of resources received for a particular relationship instance may be a particular intermediary entity, such as intermediary entity 160. Another example of a source of resources received for a particular relationship instance may be the secondary entity 196 directly. Dataset 135 may include such data regarding a plurality of sources and corresponding amounts of resources received from the sources for each of the plurality of relationship instances each associated with one or more respective domains of a plurality of domains. Such data regarding the plurality of sources and corresponding amounts of resources received from the sources for each of the plurality of relationship instances may originate from primary entity 193, intermediary entity 160, secondary entity 196 and/or one or more other secondary entities.

In some embodiments, for each relationship instance of the plurality of relationship instances, the OSP 198 electronically identifies a rate to calculate an amount of resource due to one or more respective domains associated with the relationship instance based on a source of a resource received for the relationship instance and the one or more respective domains. For example, the primary entity 193 may send request 184 to the computer system 195 of OSP 198 for services that facilitate remitting resources due to one or more respective domains. The request 184 may include the existence or identification of the relationship instance and/or one or more characteristics of the relationship instance as part of payload 134. The service engine 183 may then apply digital rules 170 to the relationship instance and/or one or more characteristics of the relationship instance to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain, then rule M_RULE5 175 is to be applied. The service engine 183 may determine that the condition is met due to one or more values of dataset 135 indicating the particular relationship instance and that the particular relationship instance is associated with the particular domain. Thus, as a consequent of precedence rule P_RULE2 172, the service engine 183 applies rule M_RULE5 175. Rule M_RULE5 175 may include a condition CN5 that indicates if a particular source of the resource received for that relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that the particular source of the resource received for that relationship instance is associated with that particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on a source of a resource received for the relationship instance and the one or more respective domains, and also calculates an amount of resources due to at least one respective domain associated with the relationship instance based on the identified rate. In some embodiments, this calculated amount of resources due may be included by the service engine 183 as part of the resulting requested resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains.

The service engine 183 may then, for each domain of the plurality of domains, aggregate a total amount of resources due to the domain based on the calculated amount of resources due for each relationship instance associated with the domain and electronically prepare a reporting document indicating the total amount of resources due to the domain and an amount of resources already remitted to the domain for the plurality relationship instances. The service engine 183 may then push, transmit or otherwise cause to be sent the reporting document to a system of the domain via network 188 and/or the computer system 190 of the primary entity 193. For example, the prepared reporting document may comprise or be included by the service engine 183 as part of the resulting requested resource 179 and/or notification 136 and the system of the domain to which the reporting document is sent may be a secondary entity accessible via network 188 other than secondary entity 196.

Figure 3:
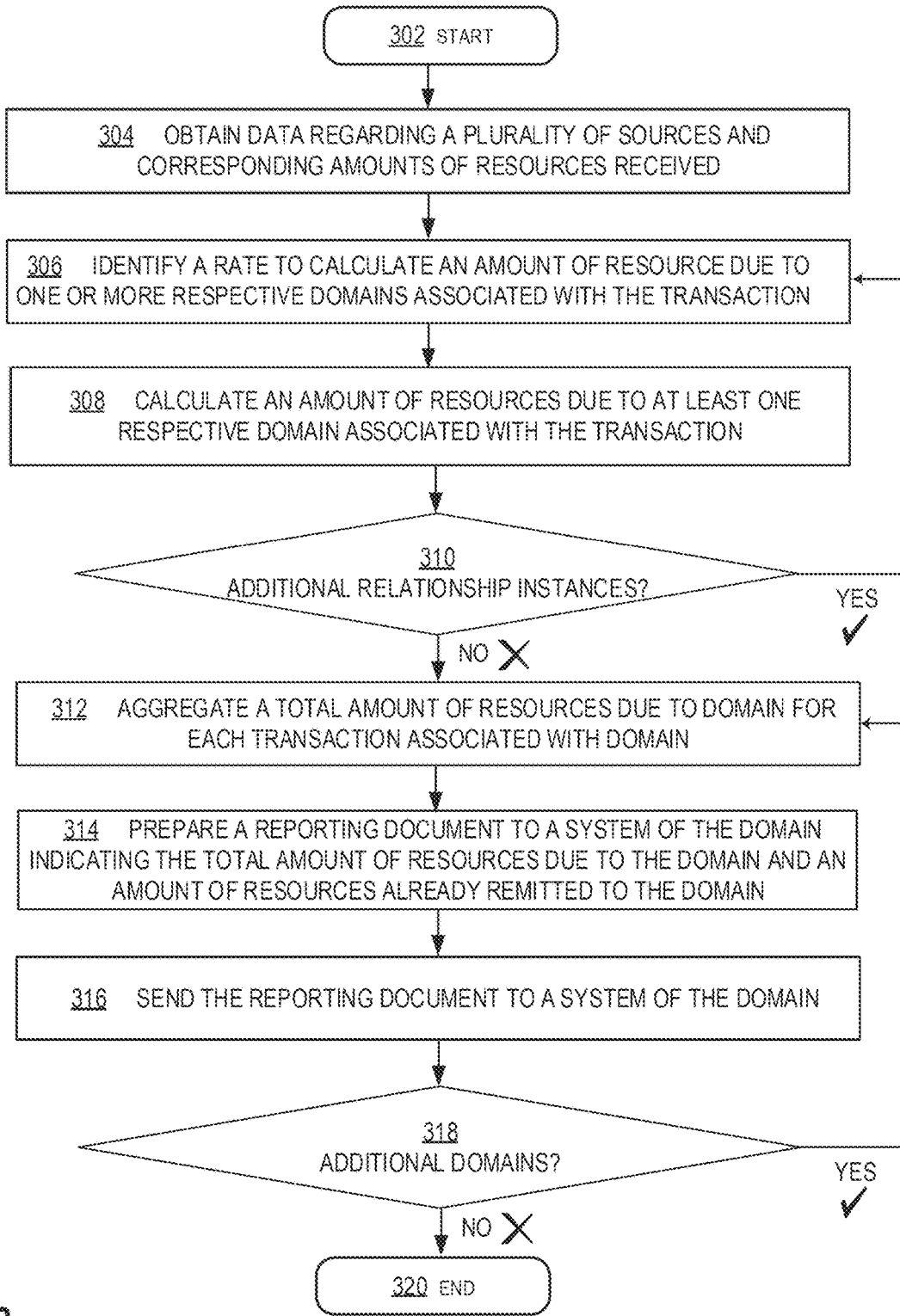
FIG. 3 is a flowchart for illustrating sample methods according to embodiments of the present disclosure.

FIG. 3 is a flowchart for illustrating sample methods according to embodiments of the present disclosure.

The sample method 300 starts at 302.

At 304, the OSP 198 electronically obtains data regarding a plurality of sources and corresponding amounts of resources received from the sources for a plurality of relationship instances. Each relationship instance is associated with one or more respective domains of a plurality of domains.

At 306, the OSP 198 electronically identifies a rate to calculate an amount of resource due to one or more respective domains associated with a relationship instance based on a source of a resource received for the relationship instance and the one or more respective domains.

At 308, the OSP 198 calculates an amount of resources due to at least one respective domain associated with the relationship instance based on the identified rate.

At 310, the OSP 198 determines whether there are additional relationship instances to process of the plurality of relationship instances. If it is determined there are additional relationship instances to process of the plurality of relationship instances, the method 300 proceeds back to 306 to continue to identify the applicable rate and calculate an amount of resources due for each relationship instance. If it is determined there are no additional relationship instances to process of the plurality of relationship instances, then the method 300 proceeds to 312.

At 312, the OSP 198 aggregates a total amount of resources due to a domain based on the calculated amount of resources due for each relationship instance associated with the domain.

At 314, the OSP 198 electronically prepares a reporting document indicating the total amount of resources due to the domain and an amount of resources already remitted to the domain for the plurality relationship instances.

At 316, the OSP 198 electronically sends, via computer network 188, the reporting document to a system of the domain.

At 318, the OSP 198 determines whether there are additional domains to process of the plurality of domains. If it is determined there are additional domains to process of the plurality of domains, the method 300 proceeds back to 312 to aggregate a total amount of resources due for the additional domain, prepare the applicable reporting document and send the reporting document to the system of the additional domain. If it is determined there are no additional domains to process of the plurality of domains, then the method 300 ends at 320.

In various embodiments, the method 300 is implemented by the service engine 183 of the OSP 198 executing software code based on digital rules 170. For example the decisions at 310 and 318 may be made according to decision diamonds, such as (referring to FIG. 2) decision diamond 286 of digital main rule M_RULE6 176 and decision diamond 287 of digital main rule M_RULE7 177. Decision diamond 286 may determine whether condition CN6 (that there are additional relationship instances to process) is met and consequent CT6 may be for the method 300 to proceed back to 306 to identify the applicable rate and calculate an amount of resources due for the additional relationship instance. Decision diamond 287 may determine whether condition CN7 (that there are additional domains to process) is met and consequent CT6 may be for the method 300 to proceed back to 312 to aggregate a total amount of resources due for the additional domain, prepare the applicable reporting document and send the reporting document to the system of the additional domain.

Figure 4:
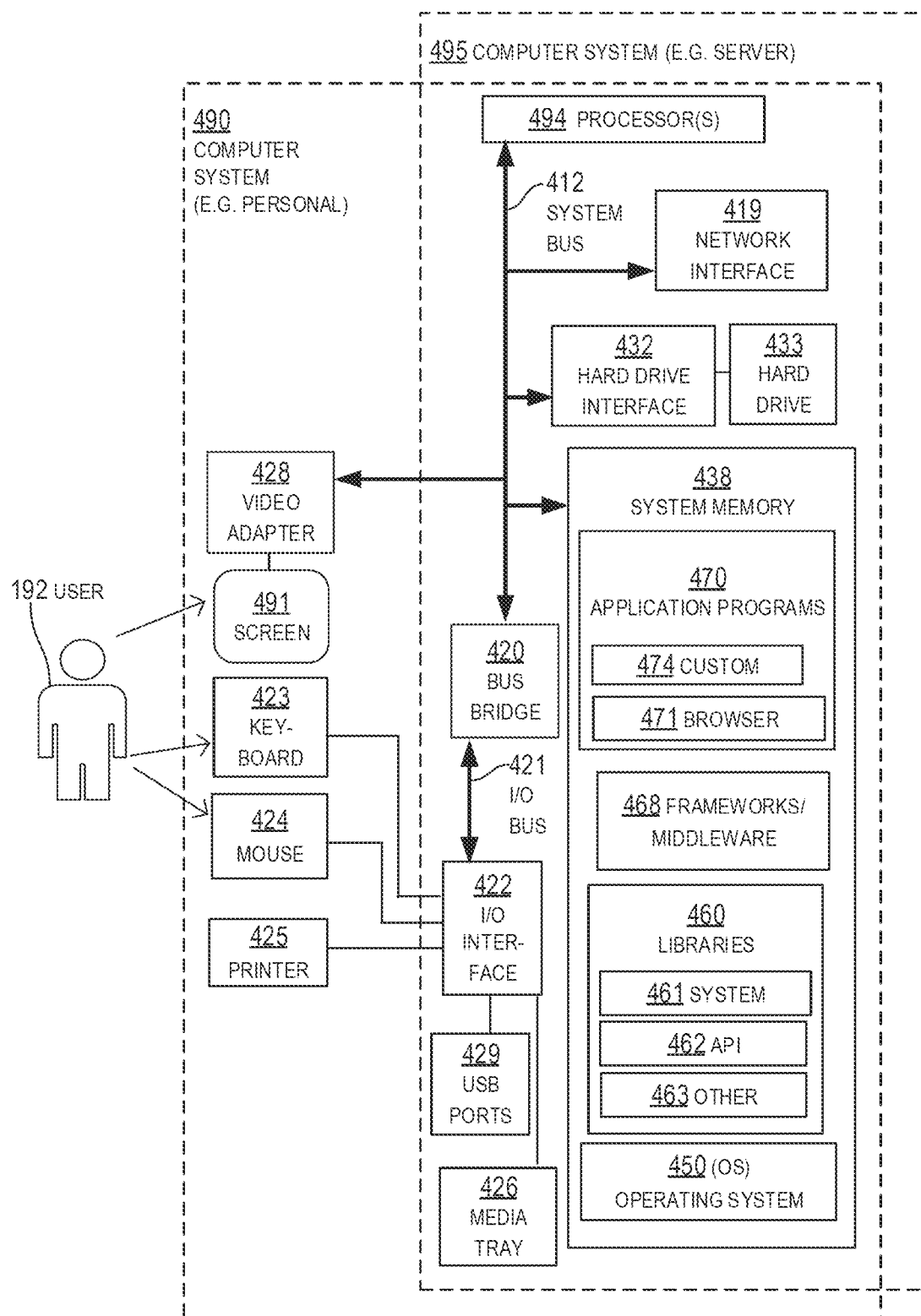
FIG. 4 is a block diagram showing additional components of sample computer systems according to embodiments of the present disclosure.

FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of OPF 189 and/or a computer system that is part of any entity or system shown in any of the Figures of the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 495, or the computer system 490, are not intended to be exhaustive. Rather, they are representative, for highlighting essential components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor(s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 2771, which is a software that can permit the user 192 to access other devices in the internet, for example while using a Graphic User Interface (GUI). The browser 2771 includes program modules and instructions that enable the computer system 495 to exchange network messages with a network, for example using Hypertext Transfer Protocol (HTTP) messaging.

The application programs 470 may include one or more custom applications 474, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 470 may include a contacts application, a book reader application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™ ANDROID™, WINDOWS® Phone, or other mobile operating systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all, of these aspects have even similar reference numerals.)

As an example use case, large companies and jurisdictions are presently beginning to enter into "Voluntary Tax Collection Agreements" or "VCAs". A VCA may be an agreement between the lodging marketplace entity 560 and a particular tax authority (such as one in the set 580 of tax authorities) for the lodging marketplace entity 560 to collect and/or remit, on behalf of property owners such as primary entity 593, lodging taxes on all lodging stay transactions handled by the lodging marketplace entity 560 that are subject to lodging tax by that particular tax authority. VCAs are established with some, but not all, tax authorities, which causes technical intricacies and problems for a single ERP to timely and efficiently determine and remit such lodging taxes on a continuous basis in real-time. In other words, current ERP applications do not have the technical functionality to timely and efficiently determine and remit such lodging taxes on a continuous basis in real-time due to such technical intricacies caused by VCAs. To solve such technical problems, the tax engine 583 disclosed herein continuously updates rules/logic to account for VCAs, and in conjunction with a license and registration check, determines the appropriate rate(s) and remittances to tax authorities.

Thus, the systems and methods described herein for automated actions for facilitating remitting resources improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

Figure 5:
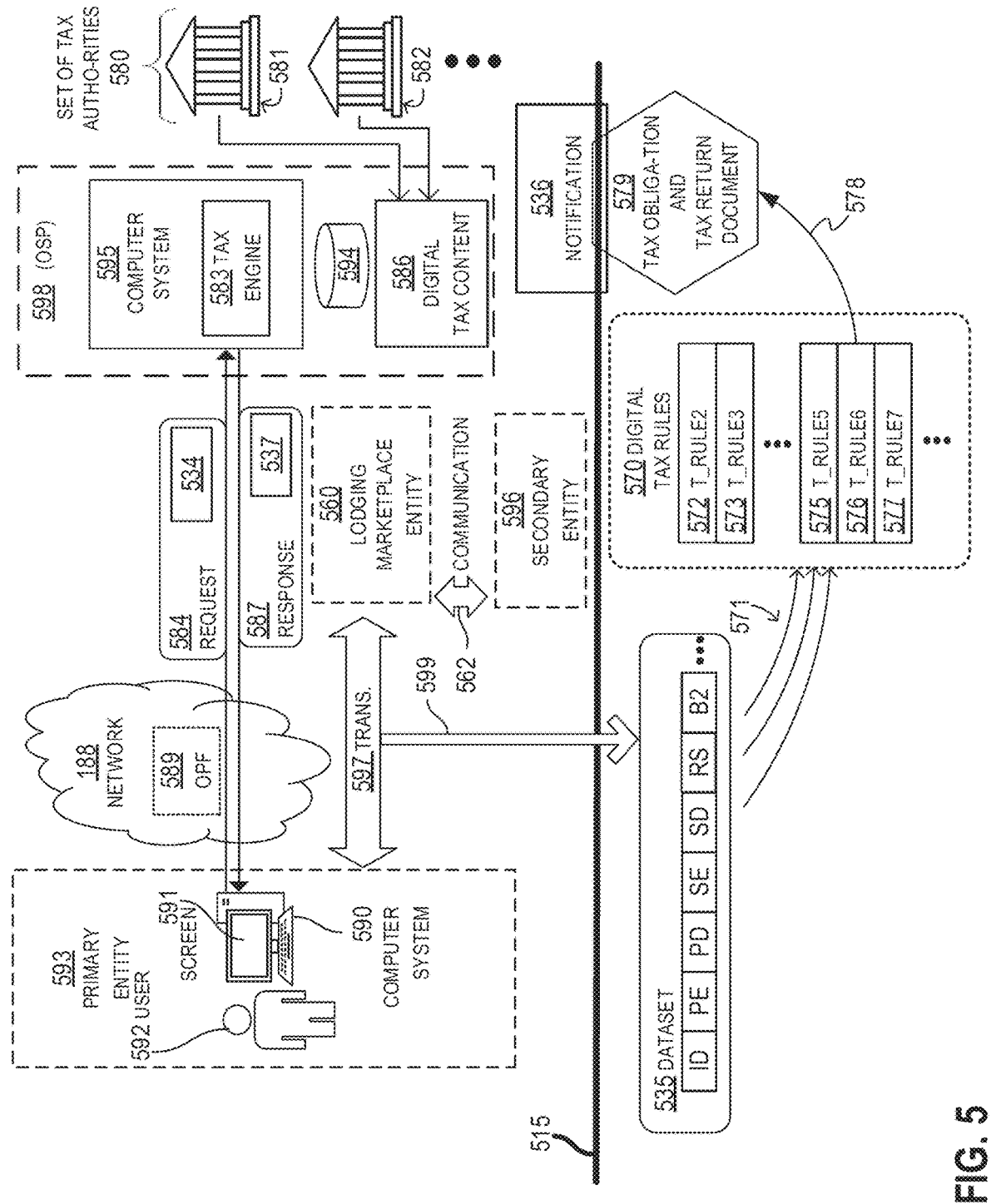
FIG. 5 is a diagram of sample aspects for describing operational examples and use cases of embodiments of the present disclosure that are improvements in automated computerized systems.

FIG. 5 is diagram for an operational example and use case where the resource 579 includes a tax obligation of a primary entity 593 and/or a secondary entity 596, due to a transaction 597. The resource 579 may also include the preparation and sending of an associated tax return document for the transaction 597. In the present case, the transaction is for a paid lodging stay for a person or group of people at a property owned or controlled by the primary entity 593. The person or group of people may be secondary entity 596 and/or the lodging stay may be paid for by secondary entity 596. In the present example, the transaction 597 for the lodging stay may be made via a lodging marketplace entity 560 that handles the transaction 597 for the lodging stay between the primary entity 593 and the secondary entity 596 via communication 562 by the lodging marketplace entity 560 with the secondary entity 596. The transaction 597 may include some or all of the data comprising the communication 562 between the lodging marketplace entity 560 and the secondary entity 596. For example, values that characterize attributes of the transaction 597 may be extracted from the communication 562 such as price, fees and/or or rate for the paid lodging stay; taxes for the paid lodging stay; address or location of the lodging; number of days—or nights—of the paid lodging stay; accommodations or services included in the paid lodging stay; identification of the primary entity 593, secondary entity 596 and/or lodging marketplace entity 560; a contract or agreement regarding the paid lodging stay; a contract or agreement regarding collection or remitting of taxes for the paid lodging stay; other terms of the paid lodging stay; etc. In some embodiments, the communication 562 may be made via network 188. In some instances, some or all of the data comprising the communication 562 may be sent directly to the OSP 598 from the lodging marketplace entity as part of dataset 535. In various embodiments, the primary entity 593 may also or instead book lodging stays for and transact directly with occupants, such as secondary entity 596, for lodging stays at the same or different properties. In such embodiments, the transaction 597 would be directly between the primary entity 593 and the secondary entity 596 instead of being made via the lodging marketplace entity 560 using communication 562 as shown in FIG. 5.

It will be recognized that aspects of FIG. 5 have similarities with aspects of FIG. 1. Portions of such aspects may be implemented as described for analogous aspects of FIG. 1. In particular, a thick line 515 separates FIG. 5, although not completely or rigorously, into a top portion and a bottom portion. Above the line 515 the emphasis is mostly on entities, components, their relationships, and their interactions, while below it the emphasis is mostly processing of data that takes place often within one or more of the components above the line 515.

Above the line 515, a computer system 595 is shown, which is used to help customers, such as a user 592, with tax compliance. Further in this example, the computer system 595 is part of an OSP 598 that is implemented as a Software as a Service (SaaS) provider, for being accessed by the user 592 online. Alternately, the functionality of the computer system 595 may be provided locally to a user.

The user 592 may be standalone. The user 592 may use a computer system 590 that has a screen 591. In embodiments, the user 592 and the computer system 590 are considered part of the primary entity 593, which is also known as entity 593. The primary entity 593 can be a business, such as a seller of items, a reseller, a buyer, and so on. In this present case, the primary entity 593 is a lodging operator, which is an individual or business that rents a short-term rental or vacation rental to another entity, such as, for example, secondary entity 596. In such instances, the user 592 can be an employee, a contractor, or otherwise an agent of the entity 593. In use cases, the entity 593 is a seller (e.g., of right or limited license to use particular lodging for a limited time), the secondary entity 596 is a buyer (e.g., of the right or limited license to use the particular lodging for a limited time) and together they are performing the buy-sell transaction 597. The buy-sell transaction 597 may involve an operation, such as an exchange of data to form an agreement (e.g., an agreement for renting lodging). This operation can be performed in person, or over the network 188, etc. In such cases the entity 593 can even be an online seller, but that is not necessary. The transaction 597 will have data that is known to the entity 593, similarly with what was described by the relationship instance 197 of FIG. 1. In the present example, the transactions 597 may be made via a lodging marketplace entity 560.

In a number of instances, the user 592, the secondary entity 593 and/or the lodging marketplace entity 560 use software applications to manage their business activities, such as sales, resource management, production, inventory management, delivery, billing, and so on. The user 592, the secondary entity 593 and/or the lodging marketplace entity 560 may further use accounting applications to manage purchase orders, reservations, bookings, sales invoices, refunds, payroll, accounts payable, accounts receivable, and so on. Such software applications, and more, may be used locally by the user 592 or lodging marketplace entity 560, or from an Online Processing Facility (OPF) 589 that has been engaged for this purpose by the user 592, the primary entity 593 and/or lodging marketplace entity 560. In such use cases, the OPF 589 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on. In some embodiments, the OPF may be, or be used by, the lodging marketplace entity 560.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

In an example case, the lodging marketplace entity 560 may electronically collect payment from the secondary entity 596 and electronically provide such payment (possibly minus a fee) to the primary entity 593 via network 188. The lodging marketplace entity 560 may in various embodiments be a listing platform accessible via network 188 that advertises property listings for lodging stays and handles transactions for such lodging stays for a plurality of lodging operators or property owners such as primary entity 593. The transaction 597 is an example of a relationship instance between the primary entity 593 and the secondary entity 596. The transaction 597 may also be an example of a relationship instance between the primary entity 593 and the lodging marketplace entity 560.

In some embodiments, along with collecting payment for the lodging stay on behalf of primary entity 593, the lodging marketplace entity 560 may also collect lodging taxes due to one or more domains, such as one or more different tax authorities 581, 582 of respective tax jurisdictions in which the property is located or with which the property is associated. In various embodiments, the lodging marketplace entity 560 may collect such lodging taxes according to a VCA. As mentioned earlier, the VCA may be an agreement between the lodging marketplace entity 560 and a particular tax authority (such as one in the set 580 of tax authorities) for the lodging marketplace entity 560 to collect and/or remit, on behalf of property owners such as primary entity 593, lodging taxes on all lodging stay transactions handled by the lodging marketplace entity 560 that are subject to lodging tax by that particular tax authority. However, the lodging marketplace entity 560 may not have a VCA with all the tax authorities for all the tax jurisdictions in which the property is located (e.g., state, county, city, other municipal or special tax jurisdictions, etc.). The primary entity 593 may also or instead book lodging stays for and transact directly with occupants, such as secondary entity 596, for lodging stays at the same or different properties. The source of revenue for such lodging stays is referred to as a direct listing as opposed to a source of revenue associated with a VCA, such as the lodging marketplace entity 560. In such cases of direct listings, the primary entity 593 may not even be aware of particular tax obligations and associated lodging taxes that the lodging marketplace entity 560 may or may not have otherwise collected (e.g., under terms of the VCA) if the transaction were made via the lodging marketplace entity 560. Thus, with multiple sources of revenue received for lodging stays in multiple different tax jurisdictions each having different tax regulations and rates, for which taxes may or may not have been collected, a technical problem is presented of how to ensure automatic calculation of tax obligations, preparation and filing of tax return documents and remittance of taxes in an accurate and timely manner. This problem is especially exacerbated for property owners with multiple different properties located in different tax jurisdictions, and that each have multiple different listings for short term stays using different listing platforms and direct listings.

To help with such complex determinations and solve such technical problems, the computer system 595 may be specialized device for tax compliance as disclosed herein. The computer system 595 may have one or more processors and memory, for example, as was described for the computer system 195 of FIG. 1. The computer system 595 thus implements a tax engine 583 to make the determinations of tax obligations and perform preparation and sending of associated tax return document(s). The tax engine 583 can be as described for the service engine 183.

The computer system 595 may further store locally entity data, i.e. data of user 592, of entity 593 and/or lodging marketplace entity 560, any of which/whom may be a customer, and/or a seller or a buyer in a sales transaction in various embodiments. The entity data may include profile data of the customer and transaction data (e.g., including a unique identifier associated with the lodging stay or a source of revenue for the lodging stay) from which a determination of a tax obligation is desired. In the online implementation of FIG. 5, the OSP 598 has a database 594 for storing the entity data. This entity data may be inputted by the user 592, and/or caused to be downloaded or uploaded by the user 592 from the computer system 590, from the lodging marketplace entity 560 or from the OPF 589, or extracted from the computer system 590 or from the lodging marketplace entity 560 or from the OPF 589, and so on. In other implementations, a simpler memory configuration may suffice for storing the entity data.

A digital tax content 586 is further implemented within the OSP 598. The digital tax content 586 can be a utility that stores digital tax rules 570 for use by the tax engine 583. As part of managing the digital tax content 586, there may be continuous updates of the digital tax rules, by inputs gleaned from a set 580 of different tax authorities 581, 582, . . . . Updating may be performed by humans, or by computers, and so on. As mentioned above, the number of the different tax authorities in the set 580 may be very large.

For a specific determination of a tax obligation, the computer system 595 may receive one or more datasets. A sample received dataset 535 is shown just below line 515, which can be similar to what was described for the dataset 135 of FIG. 1. In this example, the computer system 590 transmits a request 584 that includes a payload 534, and the dataset 535 is received by the computer system 595 parsing the received payload 534. In this example the single payload 534 encodes the entire dataset 535, but that is not required, as mentioned earlier.

In this example, the dataset 535 has been received because it is desired to determine any tax obligations arising from the buy-sell transaction 597. As such, the sample received dataset 535 has values that characterize attributes of the buy-sell transaction 597, as indicated by an arrow 599. (It should be noted that the arrow 599 describes a correspondence, but not the journey of the data of the buy-sell transaction 597 in becoming the received dataset 535.) Accordingly, in this example the sample received dataset 535 has a value ID for an identity of the dataset 535 and/or the transaction 597. The dataset 535 also has a value PE for the name of the primary entity 593 or the user 592, which can be the seller making sales transactions, some online. The dataset 535 further has a value PD for relevant data of the primary entity 593 or the user 592, such as an address, place(s) of business, prior nexus determinations with various tax jurisdictions, and so on. The dataset 535 also has a value SE for the name of the secondary entity 596, which can be the buyer. The dataset 535 further has a value SD for relevant data of the secondary entity 596, entity-driven exemption status, and so on. The dataset 535 has a value B2 for the sale price of the item sold (or in this case the price of the lodging stay).

The dataset 535 further has a value RS that includes a unique identifier that contains or identifies information identifying or regarding a revenue source system for revenue received for lodging stay transaction 597 and the location(s) of one or more properties being rented on the system. For example, the value RS may be or include a Globally Unique Identifier (GUID) or a Universally Unique Identifiers (UUID) that identifies a system of the lodging marketplace entity 560 as the source of revenue for the lodging stay transaction 597 and may also identify and/or include data regarding any VCAs that the lodging marketplace entity 560 has agreed to. The value RS may also indicate an amount of particular lodging taxes already collected for the transaction 597 by the lodging marketplace entity 560 under such VCAs. In another example, the value RS may identify the computer system 590 of the user 592 as the source of revenue for the lodging stay transaction 597 in the case of a direct listing. The value RS and/or other data in the dataset 535 may identify a location of the property of the lodging stay for the lodging stay transaction 597 for the tax engine 583 to determine which tax jurisdictions the property is located in, and thus which digital tax rules 570 (including specific tax rates) to apply and determine the overall tax obligation and individual tax obligations due to particular tax authorities 580. The dataset 535 may fewer values or have additional values, as indicated by the dot-dot-dot in the dataset 535. These values may characterize further attributes, such as characteristics of the property, data identifying of or otherwise relating to a license or registration required for the transaction, a date and possibly also time of the transaction 597, and so on.

The digital tax rules 570 have been created so as to accommodate tax rules that the set 580 of different tax authorities 581, 582 . . . promulgate within the boundaries of their tax jurisdictions. In FIG. 5, five sample digital tax rules are shown, namely T_RULE2 572, T_RULE3 573, T_RULE5 575, T_RULE6 576 and T_RULE7 577. Additional digital tax rules 570 are suggested by the vertical dot-dot-dots. Similarly with FIG. 1, some of these digital tax rules may be digital main rules that determine the tax obligation 579, while others can be digital precedence rules that determine which of the digital main rules is to be applied in the event of conflict. In some use cases, digital main rules may be about a sales tax, lodging tax or use tax being owed due to the transaction 597 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax rules that determine whether particular digital tax rules (including specific lodging tax rates) are to be applied based on one or more tax jurisdictions in which a particular property is located and whether the source of revenue for the transaction indicates that a lodging tax has already been collected for one or more of those tax jurisdictions in which a particular property is located under one or more applicable VCAs associated with the particular revenue source.

Similarly with FIG. 1, these digital tax rules 570 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 535 can be iteratively tested against these logical conditions according to arrows 571. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 576 is shown as identified and used, which is indicated also by the beginning of an arrow 578. Identifying may be performed responsive to the values of the dataset 535, which are shown as considered for digital tax rules 570 by arrows 571. For example, it can be recognized that a condition of the digital tax rule T_RULE6 576 is met by one or more of the values of the dataset 535. For instance, it can be further determined that the source of revenue for lodging transaction 597 is lodging marketplace entity 560, that the location of the property is in a tax jurisdiction of tax authority 581 that has a VCA with marketplace entity 560, and thus the tax rate(s) to be applied for calculating a total tax obligation for the transaction include those of other tax jurisdictions in which the property is also located that do not have a VCA with marketplace entity 560.

As such, the computer system 595 may produce the tax obligation 579 and tax return document, which is akin to producing the resource 179 of FIG. 1. The computer system 595 may also file or otherwise send (or cause to be filed or sent) the tax return document to one or more of the applicable tax authorities in the set of tax authorities 580 via network 188. The tax obligation 579 can be produced by the computer system 595 applying the certain digital tax rule T_RULE6 576, as indicated by the arrow 578. In this example, the consequent of the identified certain digital tax rule T_RULE6 576 may specify that a lodging tax is due, the amount is to be determined by a multiplication of the sale price of the value B2 by a specific rate, the tax return form that needs to be prepared and filed, a date by which it needs to be filed, and so on.

The computer system 595 may then cause a notification 536 to be transmitted. The notification 536 can be about an aspect of the tax obligation 579, similarly with the notification 136 of FIG. 1. In the example of FIG. 5, the notification 536 is caused to be transmitted by the computer system 595 as an answer to the received dataset 535. The notification 536 can be about an aspect of the tax obligation 579. In particular, the notification 536 may inform about the aspect of the tax obligation 579, namely that it has been determined, where it can be found, what it is, or at least a portion or a statistic of its content, and so on.

The notification 536 can be transmitted to one of an output device and another device that can be the remote device, from which the dataset 535 was received. The output device may be the screen of a local user or a remote user. The notification 536 may thus cause a desired image to appear on the screen, such as within a Graphical User Interface (GUI) and so on. The other device may be a remote device, as in this example. In particular, the computer system 595 causes the notification 536 to be communicated by being encoded as a payload 537, which is carried by a response 587. The response 587 may be transmitted via the network 188 responsive to the received request 584. The response 587 may be transmitted to the computer system 590, lodging marketplace entity 560 or to OPF 589, and so on. As such, the other device can be the computer system 590, or a device of the OPF 589, or the screen 591 of the user 592, and so on. In this example the single payload 537 encodes the entire notification 536, but that is not required, similarly with what is written above about encoding datasets in payloads. Along with the aspect of the tax obligation 579, it is advantageous to embed in the payload 537 the ID value and/or one or more values of the dataset 535. This will help the recipient correlate the response 587 to the request 584, and therefore match the received aspect of the tax obligation 579 as the answer to the received dataset 535.

Figure 6:
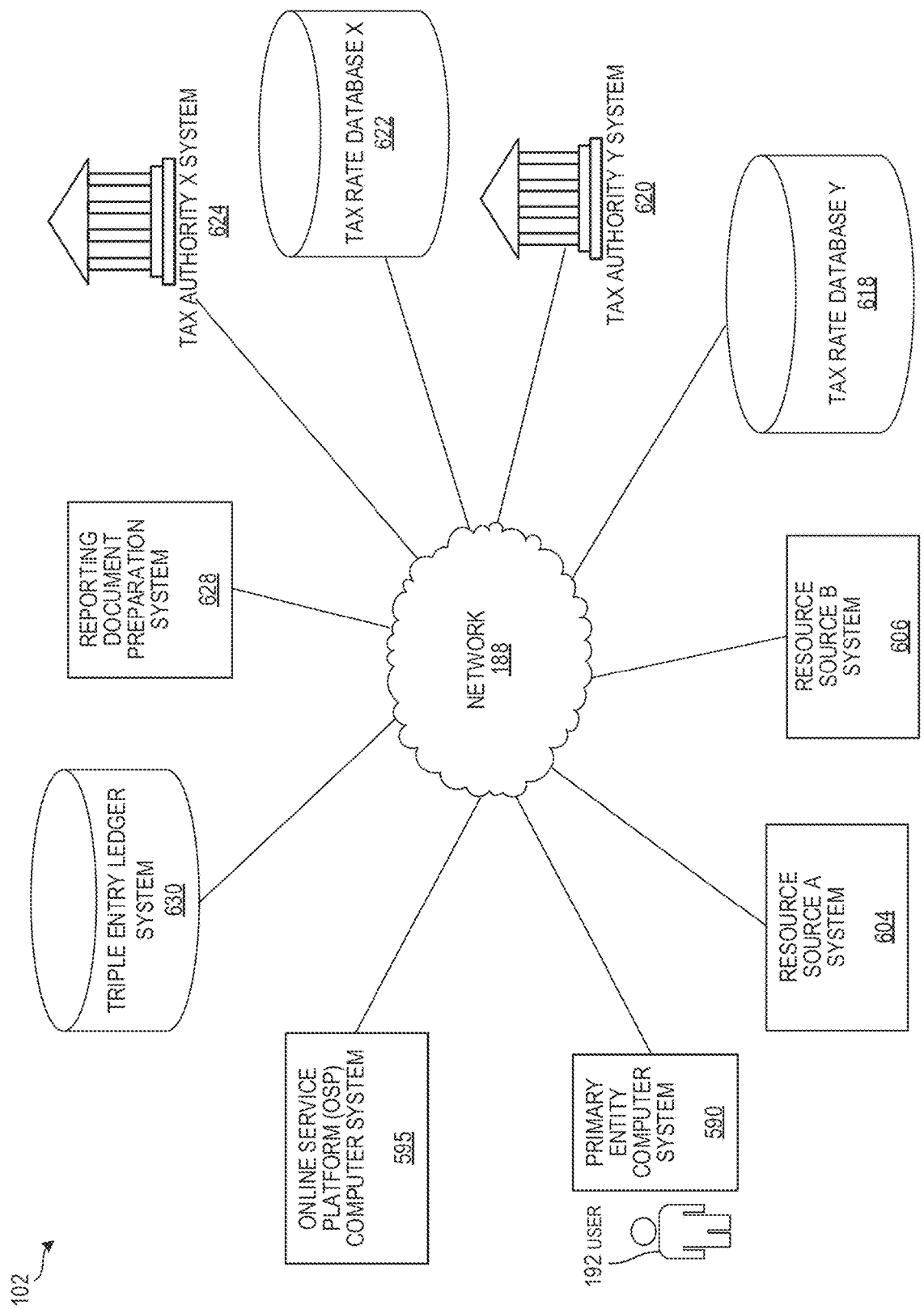
FIG. 6 is an overview block diagram illustrating an example system for automated actions for facilitating remitting resources and a technical environment in which the system may be implemented that is an improvement in automated computerized systems, according to various embodiments of the present disclosure.

FIG. 6 is an overview block diagram illustrating an example system 102 for automated actions for facilitating remitting resources and a technical environment in which the system may be implemented that is an improvement in automated computerized systems, according to various embodiments of the present disclosure.

Shown is the primary entity computer system 590 along with an associated user 192, the OSP computer system 595, an example resource source A system 604, an example resource source B system 606, an example tax authority system Y 620, an example tax rate database Y 618, an example tax authority system X 624, an example tax rate database X 622, an example reporting document preparation system 628, and an example triple entry ledger system 630. Each of the systems in FIG. 6 may be in operational communication with each other over network 188.

In some embodiments, user 192 may be a lodging operator or agent thereof and OSP computer system 595 may determine the tax obligation of user 192 for various different lodging stay transactions for a property of user 192 based on a source of the revenue for each lodging stay (e.g., resource source A system 604, resource source B system 606 or other resource source systems) and tax jurisdictions of tax authorities (e.g., ax authority system X 624 and/or tax authority system Y 622) in which the property is located. For example, resource source A system 604 may be that of a first lodging marketplace entity, such as lodging marketplace entity 560 of FIG. 5, that has a particular VCA with a particular tax authority (e.g., tax authority system X 624) to collect particular taxes at a particular rate stored in tax rate database X 622. Resource source B system 606 may be associated with a different lodging marketplace entity that has no VCA or a different VCA for a different tax jurisdiction of a different tax authority (e.g., tax authority system Y 620) to collect other taxes associated with the different tax authority at a particular rate stored in tax rate database Y 618. Thus, OSP computer system 595 may determine the tax obligation of user 192 or the entity they represent based on the location of the property and whether the revenue is received from resource source A system 604, resource source B system 606 by consulting tax rate database X 622 and/or tax rate database Y 618 accordingly.

For example, in some embodiments, OSP computer system 595 determines a type of source of the revenue received for the lodging stay and then determines whether the determined type of source is associated with a particular tax jurisdiction in a database, such as tax rate database X 622 and/or tax rate database Y 618, that includes tax rates for the particular tax jurisdiction. The OSP computer system 595 may select the database based on a determination that the determined type of source is associated with the respective tax jurisdiction. The OSP computer system 595 may then identify in the selected database the rate to calculate the amount of tax due to the respective tax authority, such as that of tax authority system X 624 or tax authority system Y 620, for the lodging stay. In an example embodiment, the OSP computer system 595 may perform this operation by electronically extracting, from data received regarding the plurality of sources, a unique identifier associated with the lodging stay and determining, based on the unique identifier, whether the source of the resource received for the lodging stay has a VCA with the one or more respective tax authorities associated with respective tax jurisdictions in which the property is located. For example, such data including the unique identifier may be received from the primary entity computer system 590, the resource source A system 604 and/or the resource source B system 606. Reporting document preparation system 628, (which may in some embodiments be part of OSP computer system 595), may be a system that then prepares and sends to tax authority system X 624 and/or tax authority system Y 622 lodging tax returns for user 192 based on the determined tax obligation of user 192.

In an example embodiment, the OSP computer system 595 ingests revenue and jurisdictional information via network 188 from one or more external sources from which lodging revenues were collected, such as resource source A system 604 and resource source B system 606. In the present example, resource source A system 604 is a system associated with a direct listing of the property with user 192 and resource source B system 606 is that of a third-party marketing platform that facilitates or handles the lodging transaction, such as lodging marketplace entity 560 of Figure, and has a VCA with a tax authority of a tax jurisdiction in which the property is located. The OSP computer system 595 uses the revenue source to identify the applicable tax rates in tax rate database X 622 or tax rate database Y 618 on the revenue stream in real-time. On an interval consistent with the lodging tax requirements of the property's jurisdiction(s) (e.g., each associated with a tax authority such as tax authority system X 624 and/or tax authority system Y 622), the OSP computer system 595 aggregates the total revenue from all revenue streams and their applicable tax rate(s). The OSP computer system 595 or the reporting document preparation system 628 then inserts the calculations, and information, into a digital, or physical, lodging tax return. In some embodiments, the OSP computer system 595 may pull the applicable funds from a customer's bank account, such as that of user 192, and submits the funds and lodging tax return via network 188 to the applicable tax authorities, such as to tax authority system X 624 and/or tax authority system Y 622. Any or all of the entities of FIG. 6 may publish such activity to a secure electronic ledger system such as triple entry ledger system 630 using a cryptographic hash or protocol, an example of which is the lodging tax triple entry ledger system depicted in FIG. 12.

In various embodiments, systems in FIG. 6 may be integrated as part of other systems of FIG. 6. Some or all of the functionality of the OSP computer system 595 may instead be implemented as a client or application of the primary entity computer system 590 that communicates directly with the other systems in FIG. 1. Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on the primary entity computer system 590, OSP computer system 595, reporting document preparation system 628, tax rate database X 622, tax rate database Y 618, and so on.

Figure 7:
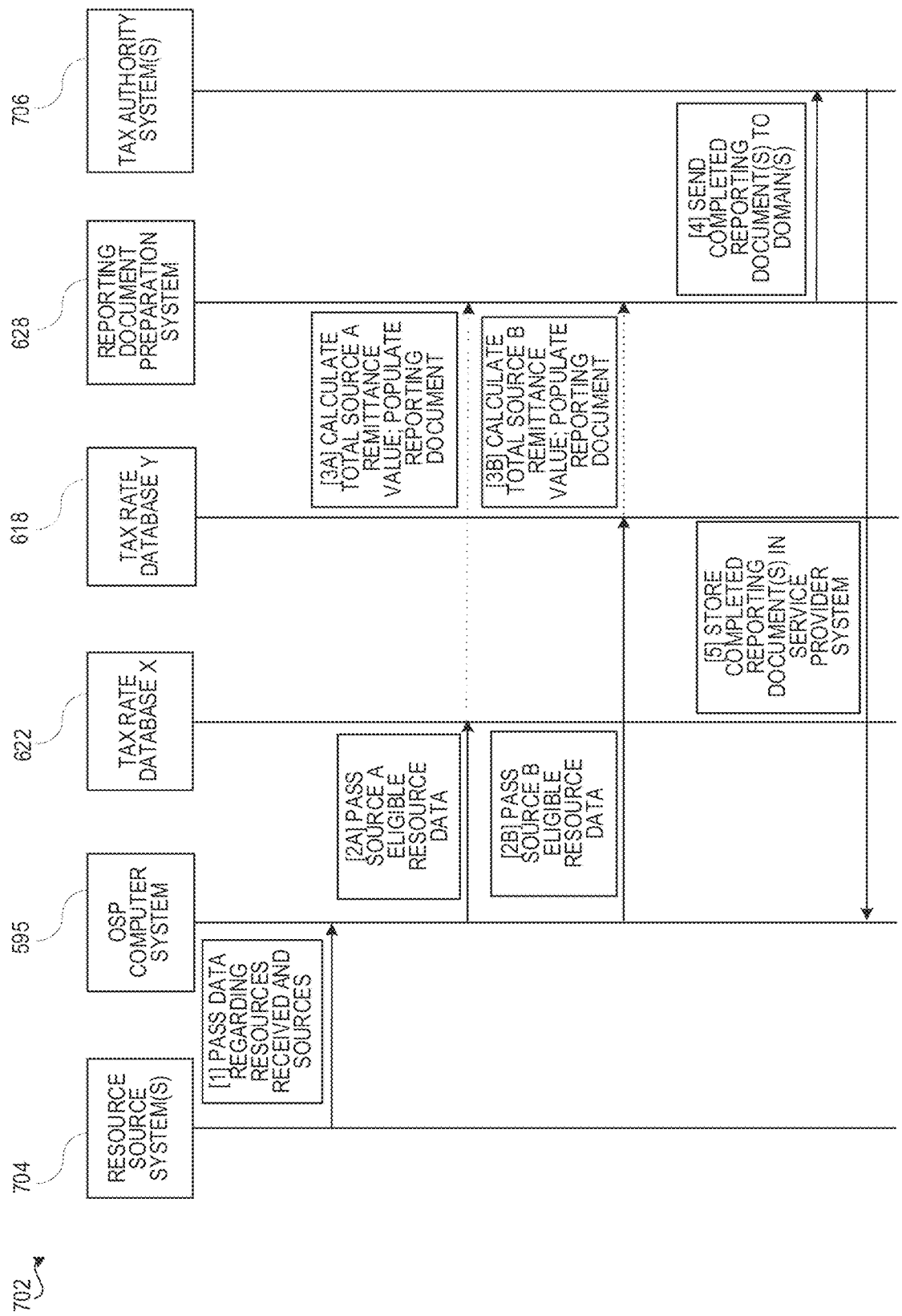
FIG. 7 is a sequence diagram that shows the data flow between one or more applications that help market and/or facilitate the rental of one or more properties and illustrates an improvement in automated computerized systems, according to various embodiments of the present disclosure.

FIG. 7 is a sequence diagram that shows the data flow 702 between one or more applications (such as those of OSP 598) that help market and/or facilitate the rental of one or more properties and illustrates an improvement in automated computerized systems, according to various embodiments of the present disclosure. At step 1, data regarding resources (e.g., revenue) received for lodging stays and sources of those resources is passed to OSP computer system 595 from resource source systems, such as primary entity computer system 590 and/or systems of lodging marketplace entities, such as lodging marketplace entity 560 of FIG. 5.

At step 2A, the OSP computer system 595 passes source A eligible resource data (e.g., data indicating revenue for lodging stays received from source A) to tax rate database X 622 to obtain an applicable tax rate for those lodging stays based on the revenue for those lodging stays being received from source A. At step 2B, the OSP computer system 595 passes source B eligible resource data (e.g., data indicating revenue for lodging stays received from source B) to a tax rate database Y 618 to obtain an applicable tax rate for those lodging stays based on the revenue for those lodging stays being received from source B.

At step 3A, the OSP computer system 595 uses the applicable rate obtained from tax rate database X 622 to calculate a total source remittance value, such as a total lodging tax obligation value, for those lodging stays in which the revenue is received from source A and the reporting document preparation system 628 populates a reporting document, such as a tax return, with the total lodging tax obligation value for those lodging stays. At step 3B, the OSP computer system 595 uses the applicable rate obtained from tax rate database Y 618 to calculate a total source remittance value, such as a total lodging tax obligation value, for those lodging stays in which the revenue for is received from source B and the reporting document preparation system 628 populates a reporting document, such as the tax return, with the total lodging tax obligation value for those lodging stays.

At step 4, the reporting document preparation system 628 sends the completed reporting document(s) (e.g., the completed tax return documents) to the applicable tax authority system(s) 706, such as those of those of different tax authorities 581 and 582 of FIG. 5.

At step 5, the OSP computer system 595 may obtain from the tax authority system(s) 706 the completed reporting document(s) (e.g., the completed tax return documents) that were processed by the applicable tax authority system(s) 706. Such documents may be electronically requested by the OSP computer system 595 or automatically pushed by the tax authority system(s) 706 to the OSP computer system 595.

In some embodiments, prior to or in conjunction with the process illustrated by the sequence diagram that shows data flow 702, a license and/or registration check may be automatically performed by the OSP computer system 595 with the tax authority system(s) 706. The license and/or registration check may be an automated process that verifies that license and registration requirements are being complied with involving the rental the properties and the resources received (e.g., revenue) for lodging stays at those properties. For example, the license requirements may indicate specific lodging operator licensing requirements of the tax authority and procedures for the lodging operator to be licensed and hold and maintain a current license for lodging operations. The registration requirements may indicate specific registration requirements of the tax authority and procedures for the lodging operator and/or property to be registered and hold and maintain a current registrations related to lodging operations. If such licenses and/or registrations need to be obtained and/or updated, the OSP computer system 595 may automatically generate and populate the documents required to do so based on data extracted from the dataset 535 of FIG. 5 and send them to the applicable tax authority system(s) 706.

Figure 8:
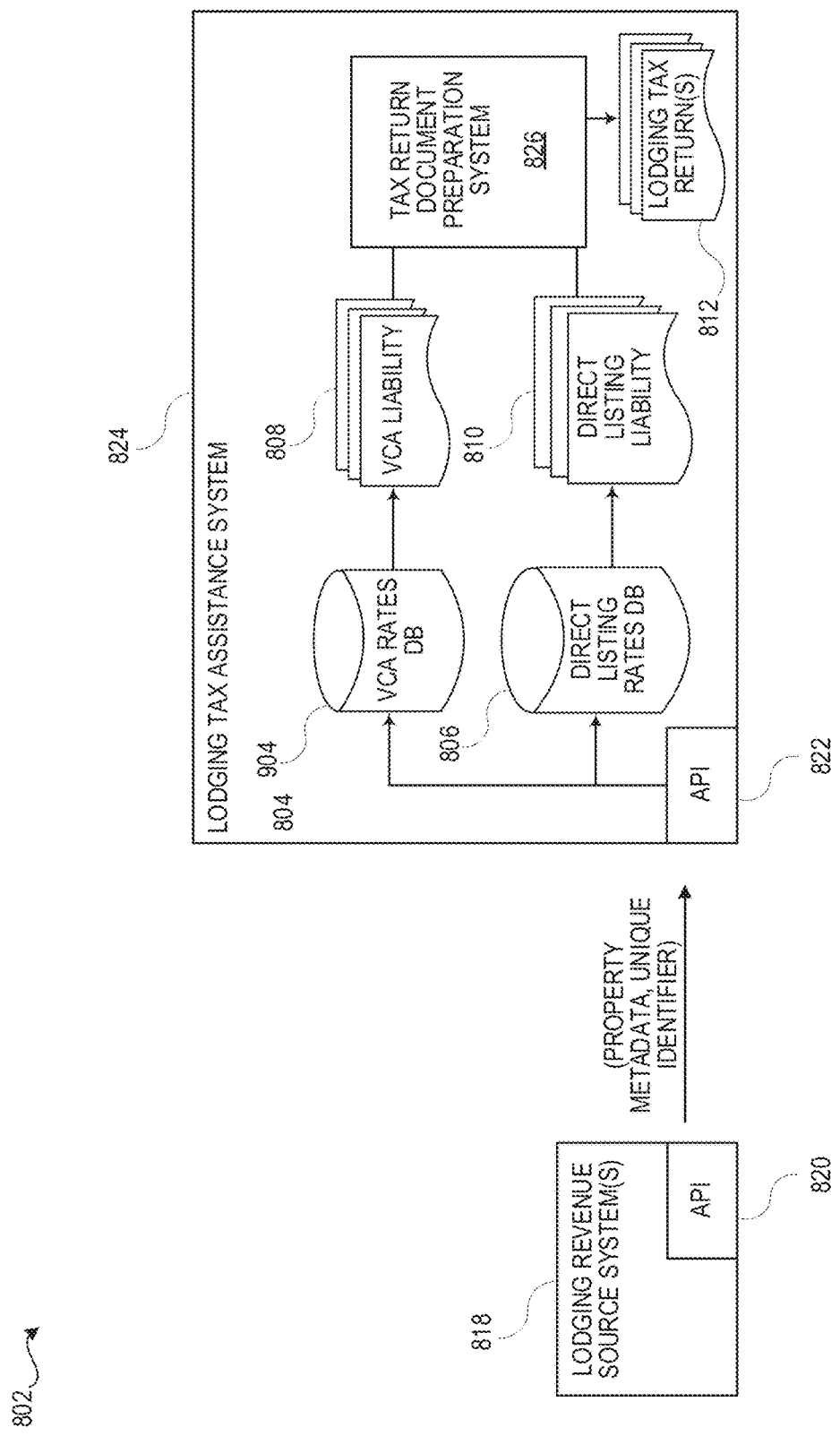
FIG. 8 is a block diagram illustrating a technological system and process involving how a lodging tax assistance system curates and applies logic related to marketplace rates that is an improvement in automated computerized systems, according to various embodiments of the present disclosure.

FIG. 8 is a block diagram illustrating a technological system 802 and process involving how the lodging tax assistance system 824 curates and applies logic related to marketplace rates that is an improvement in automated computerized systems, according to various embodiments of the present disclosure. An example of OSP 598 is lodging tax assistance system 824, which may include some or all functionality and components of OSP 598. Lodging transaction revenue data is reported via API 820 to lodging tax assistance system 824 from one or more lodging revenue source system(s) 818 via API 822. In various embodiments, lodging revenue source system(s) 818 may include, but are not limited to, systems of lodging marketplace entities, such as lodging market place entity 560 and systems of lodging operators, property owners and/or lodging renters in the case of direct listings, such as computer system 590 or computer systems of the secondary entity 596 of FIG. 5. Such data includes a unique identifier passed to the lodging tax assistance system 824. This identifier may be a GUID, UUID, or some equivalent technology. The unique identifier contains information on the revenue source system(s) 818 and the location(s) of one or more properties being rented on such systems. The lodging tax assistance system 824 uses the unique identifier associated with the revenue stream, in addition to the taxing jurisdiction(s) of one or more properties, to determine whether VCA tax rates stored in VCA rates database 904 or direct listing tax rates stored in direct listing rates database 806 are applicable. The lodging tax assistance system 824 then determines the associated VCA tax liability 808 associated with the VCA rates and the associated direct listing tax liability 810 associated with the direct listing rates.

There may be instances where a VCA tax rate is applicable and the rate covers some, but not all, jurisdictions within a transaction. For example, this may occur when the property falls within multiple tax jurisdictions and the tax authority for one or more of those tax jurisdictions does not have a VCA associated with the revenue source. In such instances, the lodging tax assistance system 824 determines how much tax is being collected by the revenue source system and what the remaining tax collection balance is, and to which jurisdictions it is due. This information is curated by performing web scraping on publicly available tax agreements (e.g., VCAs), through established relationships with partners or vendors associated with lodging tax assistance system 824 and/or notifications from the lodging tax assistance system 824 user base. In instances where the agreed upon VCA agreement between the revenue source and the tax jurisdiction(s) covers the full tax liability for the property owner, the lodging tax assistance system 824 generates a $0 tax calculation. All tax calculations are aggregated with one another the lodging tax assistance system 824. The sum of all tax liabilities, as well as all relevant metadata, is then mapped on to one or more lodging tax return(s) 812 by a tax document preparation system 826 for all applicable taxing jurisdictions. The appropriate payment amounts are then remitted to all applicable tax authorities of the taxing jurisdictions by the lodging tax assistance system 824.

Figure 9:
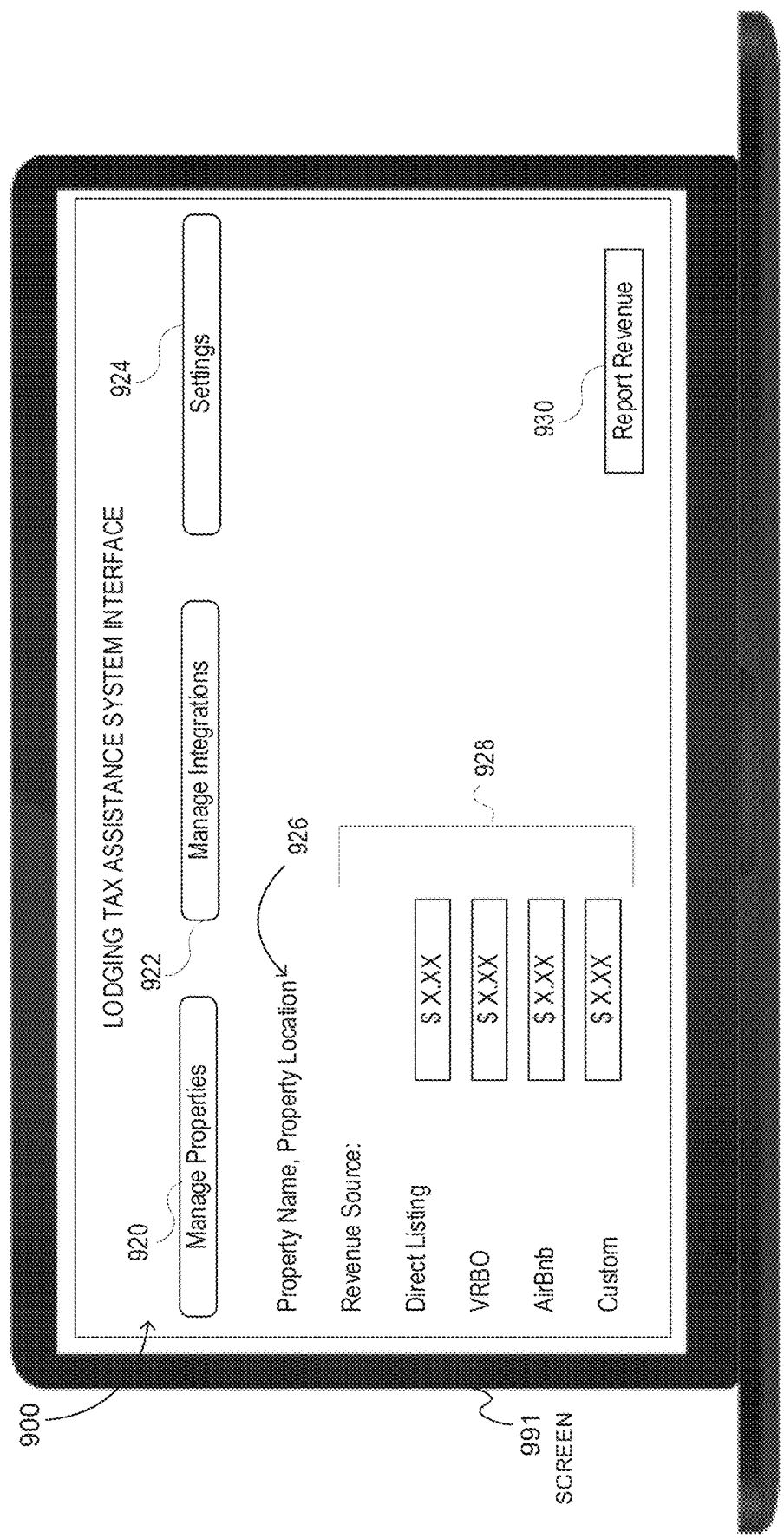
FIG. 9 is a sample view of a User Interface (UI) for a lodging tax assistance system in a use case of an embodiment that is an improvement in automated computerized systems.

FIG. 9 is a sample view of a User Interface (UI) 900 for a lodging tax assistance system in a use case of an embodiment that is an improvement in automated computerized systems. For example, the User Interface (UI) 900 may be of the lodging tax assistance system 824 of FIG. 8 and/or OSP 598 of FIG. 5 and displayed on a screen 991, which may be an example of screen 591 of FIG. 5. In various embodiments, the UI 900 may be for lodging operators such as property owners or representatives thereof to interface with the lodging tax assistance system 824 to obtain the tax assistance services of the lodging tax assistance system 824 regarding the rental of their properties.

As part of UI 900, shown is a selectable "Manage Properties" GUI element 920 that, when selected by user 192, provides GUI features for user 192 to manage properties and/or property listings for which lodging tax assistance is requested, such as adding or removing properties from the lodging tax assistance system 824 and entering property information such as property name and location 926. UI 900 may also be used for the user 192 to input other data, such as that of dataset 535 of FIG. 5. Also shown is a "Revenue Source" GUI element 928 that may display and/or receive as input associated amounts of revenue received from individual revenue sources for lodging transactions over a period of time and/or for specific dates for an individual property having property name and location 926.

Provided as part of UI 900 is also a "Manage Integrations" GUI element 922 that, when selected by user 192, provides GUI features for user 192 to manage integrations of the lodging tax assistance system 824 with other systems, including lodging marketplace entities, such as lodging marketplace entity 560, and tax authorities systems 706, such as those of different tax authorities 581 and 582 of FIG. 5. For example, this integration may enable sending and/or receiving of data, such as lodging transaction data, revenue data, tax obligation data, and data included in dataset 535 of FIG. 5, etc., to and from systems of such entities. Provided in UI 900 is also a "Settings" GUI element 924, that, when selected by user 192, provides GUI features for user 192 to adjust various settings of the lodging tax assistance system 824 and/or or preferences of the user 192, such as to adjust automatic tax obligation calculation settings, tax document preparation and transmission settings, etc. A selectable "Report Revenue" GUI element 930 is provided that, when selected, reports or otherwise transmits the revenue data displayed and/or entered in "Revenue Source" GUI element 928 to the lodging tax assistance system 824 for further processing to calculate tax liability or obligation and/or to the applicable tax authority systems 706 in a tax return document.

Figure 10:
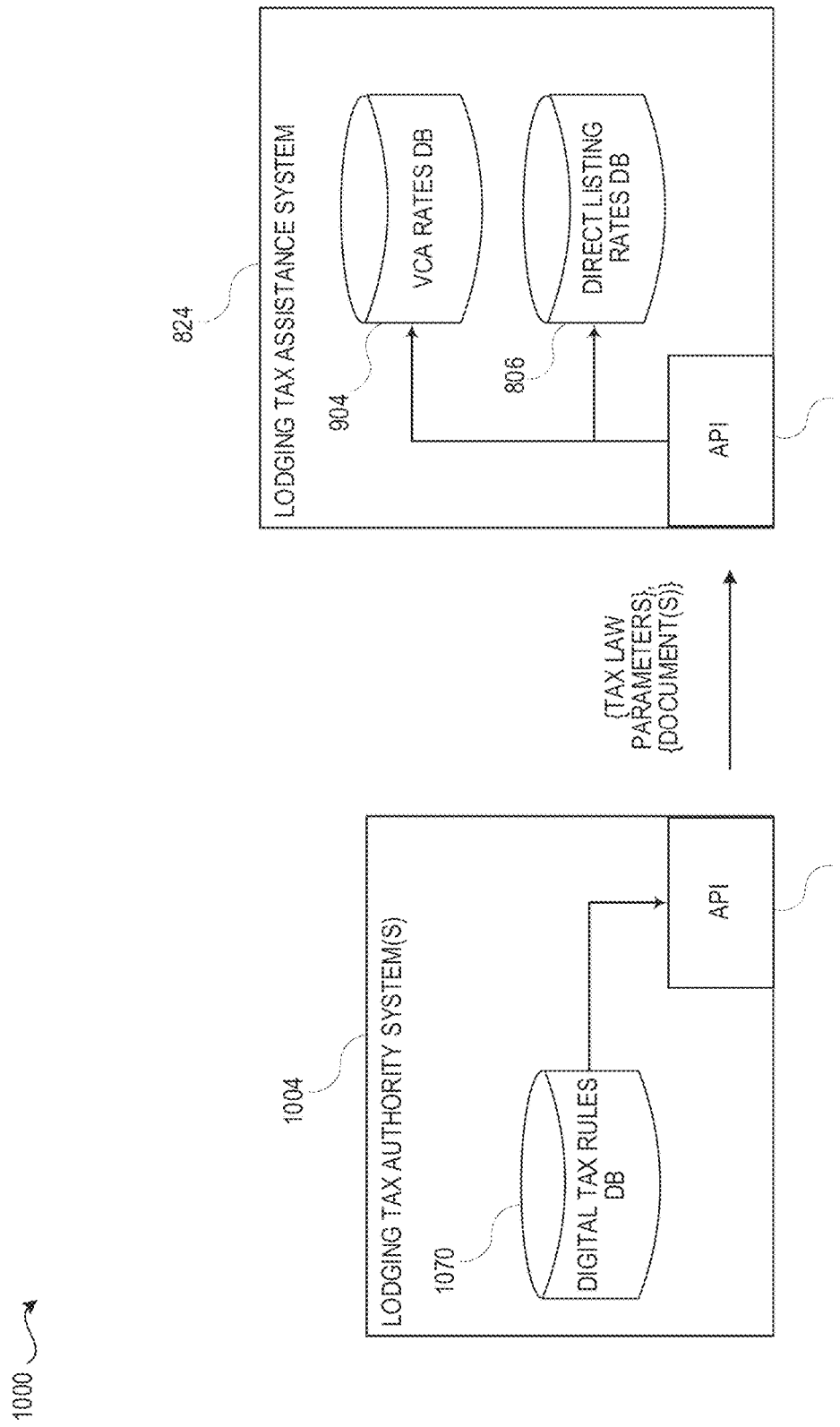
FIG. 10 is a block diagram illustrating a technological system and process involving how tax authorities publish rates and rules into the lodging tax assistance system that is an improvement in automated computerized systems, according to various embodiments of the present disclosure.

FIG. 10 is a block diagram illustrating a technological system 1000 and process involving how tax authorities, such as different tax authorities 581 and 582 of FIG. 5, publish rates and rules into the lodging tax assistance system 824 that is an improvement in automated computerized systems, according to various embodiments of the present disclosure. In addition to providing an interface for property owners, the lodging tax assistance system 824 provides a user interface, and API, for tax authorities, such as different tax authorities 581 and 582 of FIG. 5, to publish rates and rules into the lodging tax assistance system 824.

Shown are lodging tax authority system(s) 1004, such as those of different tax authorities 581 and 582 of FIG. 5. Each respective lodging tax authority system of the lodging tax authority system(s) 1004 may include a digital tax rules database 1070 that stores digital tax rules (including specific tax rates) for lodging taxes set by the lodging tax authority of the respective lodging tax system. For example, such digital tax rules may be examples of digital tax rules 570 of FIG. 5. These digital tax rules stored in the digital tax rules database 1070 may include geographical boundaries, logic that triggers taxability, partial tax taxability, and/or tax exemptions, and document(s)/artifact(s) that are required to maintain compliance with taxing authorities.

Examples of rates, rules, and logic of the digital tax rules stored in the digital tax rules database 1070 may include, but are not limited to: the ability to input new parameters that should be used in tax determination (e.g. number of nights stayed, size of the property, and nightly rate); the ability to set one or more value ranges, and thresholds, on parameters used in tax determination; the ability to establish tax exemption rules based on taxing parameters and/or threshold logic; the ability to set dates/phases, etc. The digital tax rules stored in the digital tax rules database 1070 may be published into or otherwise communicated to the lodging tax assistance system 824 via an API 1008 of the respective lodging tax system of the lodging tax authority system(s) 1004 by communicating the information over network 188 to a corresponding API 1002 of the lodging tax assistance system 824. The lodging tax assistance system 824 may then store various tax rates in the VCA rates database 904 or the direct listing rates database 806 according to whether or not the tax authority of the respective lodging tax system of the lodging tax authority system(s) 1004 has a VCA with one or more lodging marketplace entities, such as lodging marketplace entity 560 of FIG. 5. In some embodiments, data indicative of whether the tax authority of the respective lodging tax system of the lodging tax authority system(s) 1004 has a VCA with one or more lodging marketplace entities, and digital tax rules regarding such agreements, may also be included in the digital tax rules stored in the digital tax rules database 1070 and acted upon accordingly by the lodging tax assistance system 824 when determining tax obligations.

Figure 11:
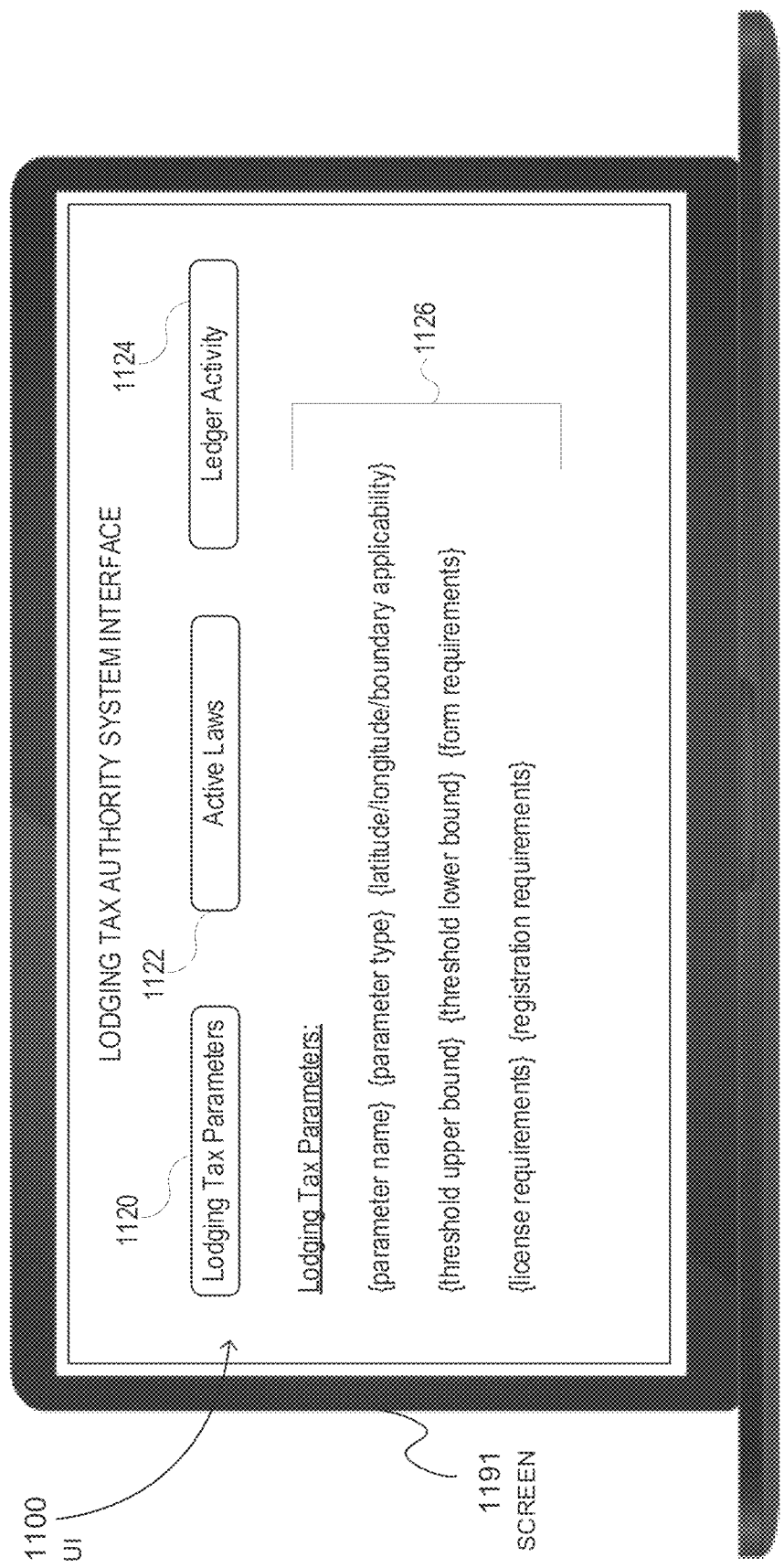
FIG. 11 is a sample view of a User Interface (UI) for a lodging tax authority system in a use case of an embodiment that is an improvement in automated computerized systems.

FIG. 11 is a sample view of a User Interface (UI) 1100 for a lodging tax authority system in a use case of an embodiment that is an improvement in automated computerized systems. For example, the User Interface (UI) 1100 may be of the lodging tax assistance system 824 of FIG. 8 and/or OSP 598 of FIG. 5 and displayed on a screen 1191 of a respective lodging tax system of the lodging tax authority system(s) 1004. For example, such lodging tax authority system(s) 1004 may include those of different tax authorities 581 and 582 of FIG. 5. An example of such a screen is screen 491 of the sample computer system 490 of FIG. 4. In various embodiments, the UI 1100 may be for tax authorities, such as different tax authorities 581 and 582 of FIG. 5, to publish rates and rules into the lodging tax assistance system 824, receive completed tax returns and other documents via the lodging tax assistance system 824, and otherwise interact with the lodging tax assistance system 824.

As part of UI 1100, shown is a selectable "Lodging Tax Parameters" GUI element 1126 that, when selected by a user, provides GUI features for the user to communicate lodging tax parameters, which may be part of the digital tax rules stored in the digital tax rules database 1070 of FIG. 10. As shown on UI 1100, the lodging tax parameters to be communicated via the UI 1100 to the lodging tax assistance system 824 may be entered and/or displayed on UI 1100. Lodging tax parameters and associated data that may be entered and/or displayed on UI 1100 may include, but are not limited to: parameter name, parameter type, latitude/longitude/boundary applicability, threshold upper bound, threshold lower bound, form requirements, license requirements and registration requirements. The "latitude/longitude/boundary applicability" parameter values, for example, may specify latitude and longitude and/or other data that defines a boundary of a tax jurisdiction of the tax authority, such that properties that fall within such a boundary may be subject to lodging taxes of the tax authority. The "threshold upper bound" and "threshold lower bound" parameters values, for example, may specify upper and lower thresholds regarding length of lodging stay, size of property, and/or amounts of revenue received by lodging operators for a lodging stay to trigger various tax liabilities. The "form requirements" parameter may include electronic documents or other forms that are required to maintain compliance with taxing authorities. The "license requirements" parameter may indicate specific lodging operator licensing requirements of the tax authority and procedures for the lodging operator to be licensed and hold and maintain a current license for lodging operations. The "registration requirements" may indicate specific registration requirements of the tax authority and procedures for the lodging operator and/or property to be registered and hold and maintain a current registrations related to lodging operations. Additional parameters may also be displayed by and/or inputted into the "Lodging Tax Parameters" GUI element 1126.

Provided as part of UI 1100 is also an "Active Laws" GUI element 1122 that, when selected by a user, provides GUI features for the user to view, add, update or change, the tax laws currently active in the lodging tax assistance system 824 for the particular tax authority that may be applicable to the lodging tax parameters 1126. In some embodiments, some or all of such tax laws may be stored in the form of machine readable digital tax rules 570 of FIG. 5. In other embodiments, some or all of such tax laws may be stored in the form of human-readable language, published on the web, etc.

Figure 12:
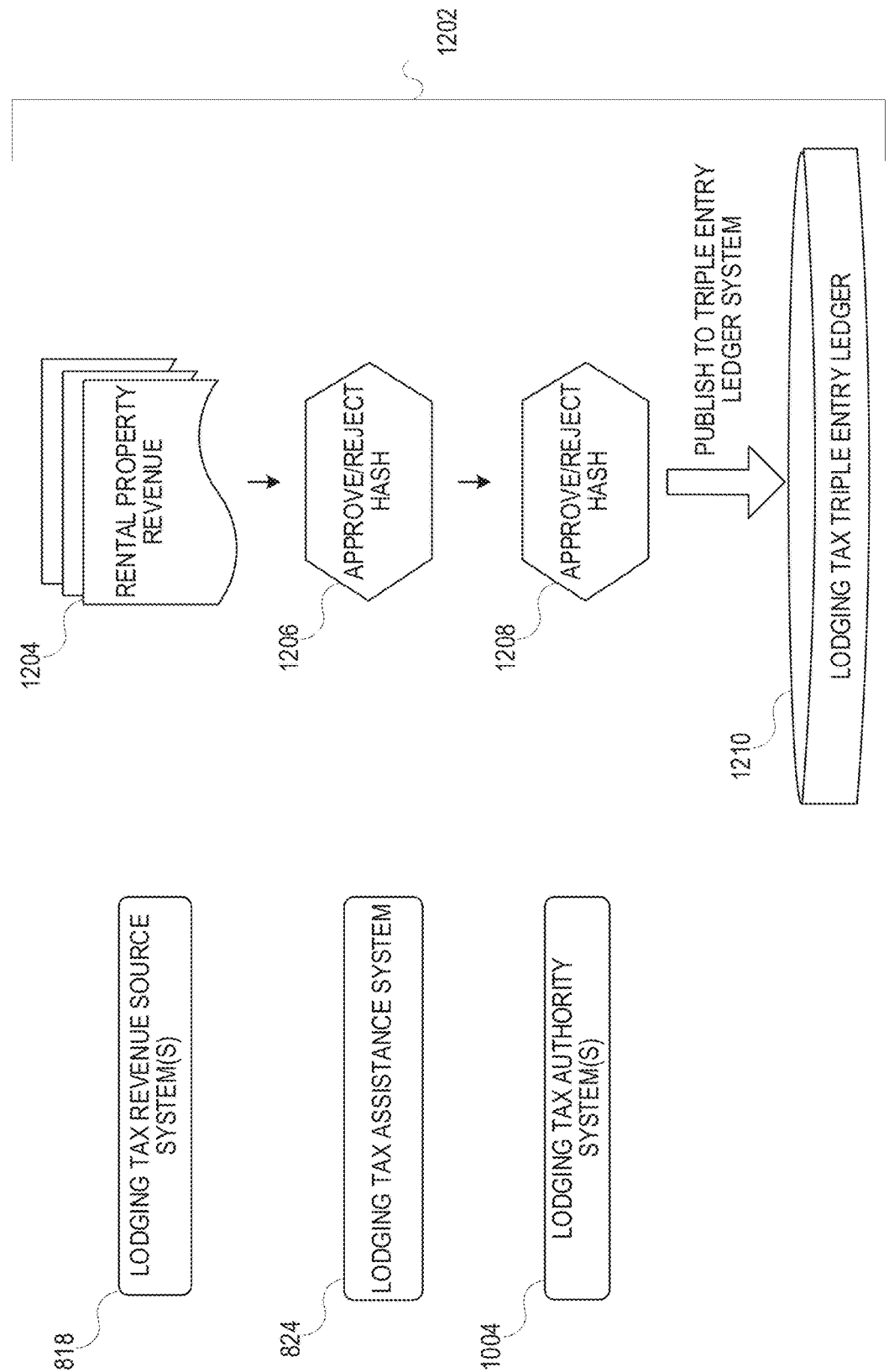
FIG. 12 is a block diagram illustrating a technological system and process for publishing an auditable transaction log of lodging related activity to a triple ledger entry system that is an improvement in automated computerized systems, according to various embodiments of the present disclosure.

Provided as part of UI 1100 is also a "Ledger Activity" GUI element 1124 that, when selected by a user, provides GUI features for the user to view, add, approve and reject ledger activity related to lodging taxes and related transactions in a secure electronic ledger system using a cryptographic hash or protocol, such as the triple entry ledger system depicted in FIG. 12.

FIG. 12 is a block diagram illustrating a technological system 1202 and process for publishing an auditable transaction log of lodging related activity to a triple ledger entry system that is an improvement in automated computerized systems, according to various embodiments of the present disclosure. The lodging tax triple entry ledger system 1202, which is an example of the triple entry ledger system 630 of FIG. 6, is a secure electronic ledger system using a cryptographic hash or protocol, or other digital signature technique, for entries in the lodging tax triple entry ledger system 1210. In the present example, the lodging tax triple entry ledger system 1210 is accessible by lodging tax authority system(s) 1004, such as those of different tax authorities 581 and 582 of FIG. 5, the lodging tax assistance system 824 and respective systems of one or more entities involved in a plurality of lodging transactions, such as lodging tax revenue source system(s) 818. In various embodiments, lodging revenue source system(s) 818 may include, but are not limited to: systems of lodging marketplace entities, such as lodging market place entity 560; systems of lodging operators, property owners and/or lodging renters in the case of direct listings, such as computer system 590; and computer systems of the secondary entity 596 of FIG. 5.

The lodging tax triple entry ledger system 1202 enables tax authorities, such as tax authorities 581 and 582 of FIG. 5, to enforce, maintain, and automate the ability to achieve $0 of lodging tax fraud for an indefinite period. The process of calculating, remitting, and filing lodging taxes currently suffers from an information asymmetry problem which is described as follows. The property owner receives bookings through a variety of avenues including direct listings and lodging marketplace entities, such as lodging marketplace entity 560 of FIG. 5. Examples of lodging marketplace entities include, but are not limited to, those that provide listing platforms (such as AirBnb® or VRBO®), and/or marketplace aggregators (e.g. Evolve®, in which the property owner hires a firm to do a combination of direct listing and listing platforms). Based on the location, revenue, number of nights stayed, and various other factors, the property owner calculates and remits lodging taxes to the jurisdiction. However, the property owner can under, or over, report revenue based on the aforementioned factors (whether it be intentional or unintentional). Although the lodging tax assistance system 824 helps facilitate the remittance process, in some embodiments it does not act as a trusted third party to verify and validate regulations and tax rates established by the tax authorities associated with lodging tax authority system(s) 1004. Traditionally, tax authorities must manually audit lodging returns in order to detect fraud or overpayment. In either instance, it is also an expensive and laborious process to collect underpayments and refund overpayments. The lodging tax triple entry ledger system 1202 implements a method as a technical improvement and solution for overcoming this information asymmetry problem.

Using the system disclosed in FIG. 12, governments can publish lodging tax rates and rules, in real-time, via the lodging tax authority system(s) 1004 to the lodging tax triple entry ledger 1210. Property owners, who are subscribed to the lodging tax triple entry ledger 1210, can leverage the rules and logic published to the lodging tax triple entry ledger 1210 by the applicable tax authority to charge and remit lodging taxes in real-time. Then, the lodging tax assistance system 824 takes on a role of a trusted third party, by preparing and filing tax returns and validating that the property owner reported and remitted all applicable taxes. In various embodiments, the lodging tax assistance system 824 may electronically publish to the lodging tax triple entry ledger 1210, using a cryptographic hash or protocol, one or more of: the rate identification; the calculation of the amount of resource due for each domain for each lodging stay; the aggregation of the total amount of resources due for each domain; the preparation and sending of the reporting document; and the electronic remittance of the balance of resources due for each tax authority. In some embodiments, all actions, approvals, rejections, etc., are published to the lodging tax triple entry ledger 1210 so that there is full auditability and transparency across parties.

For example, the lodging revenue source system(s) 818 may publish entries in the lodging tax triple entry ledger 1210 that reflect amounts of rental property revenue 1204 for specific lodging transactions. For each lodging transaction, the lodging tax assistance system 824 makes an entry in the triple entry ledger 1210 that approves or rejects the corresponding entry in the lodging tax triple entry ledger 1210 that reflects the amount of rental property revenue 1204 for that transaction. The entry in the lodging tax triple entry ledger 1210 by the lodging tax assistance system 824 approving or rejecting the entry of the lodging revenue source system(s) 818 may be signed by a lodging tax assistance system "approve/reject" hash 1206 of the entry. The lodging tax authority system 1004 makes an entry to the lodging tax triple entry ledger 1210 that approves or rejects the entry in the lodging tax triple entry ledger 1210 by the lodging tax assistance system 824. The entry in the lodging tax triple entry ledger 1210 by the lodging tax authority system 1004 approving or rejecting the entry of the by the lodging tax assistance system 824 may be signed by a lodging tax authority system "approve/reject" hash 1208 of the entry. Also, for each lodging transaction, the lodging tax authority system 1004 make an entry in the lodging tax triple entry ledger 1210 that approves or rejects the corresponding entry in the lodging tax triple entry ledger system 1210 that reflects the amount of rental property revenue 1204 for that transaction. In some embodiments, once the entries in the lodging tax triple entry ledger 1210 that reflect amounts of rental property revenue 1204 for specific lodging transactions are approved by all applicable entities (e.g., by the applicable lodging revenue source system(s) 818, the applicable lodging tax assistance system 824 and the applicable lodging tax authority system(s) 1004) an entry may be published to the triple entry ledger system 1210 which indicates that such entries (and associated transactions and amounts) are approved by all such entities. Thus, the triple entry ledger system 1210 facilitates full auditability and transparency across applicable parties.

Figure 13:
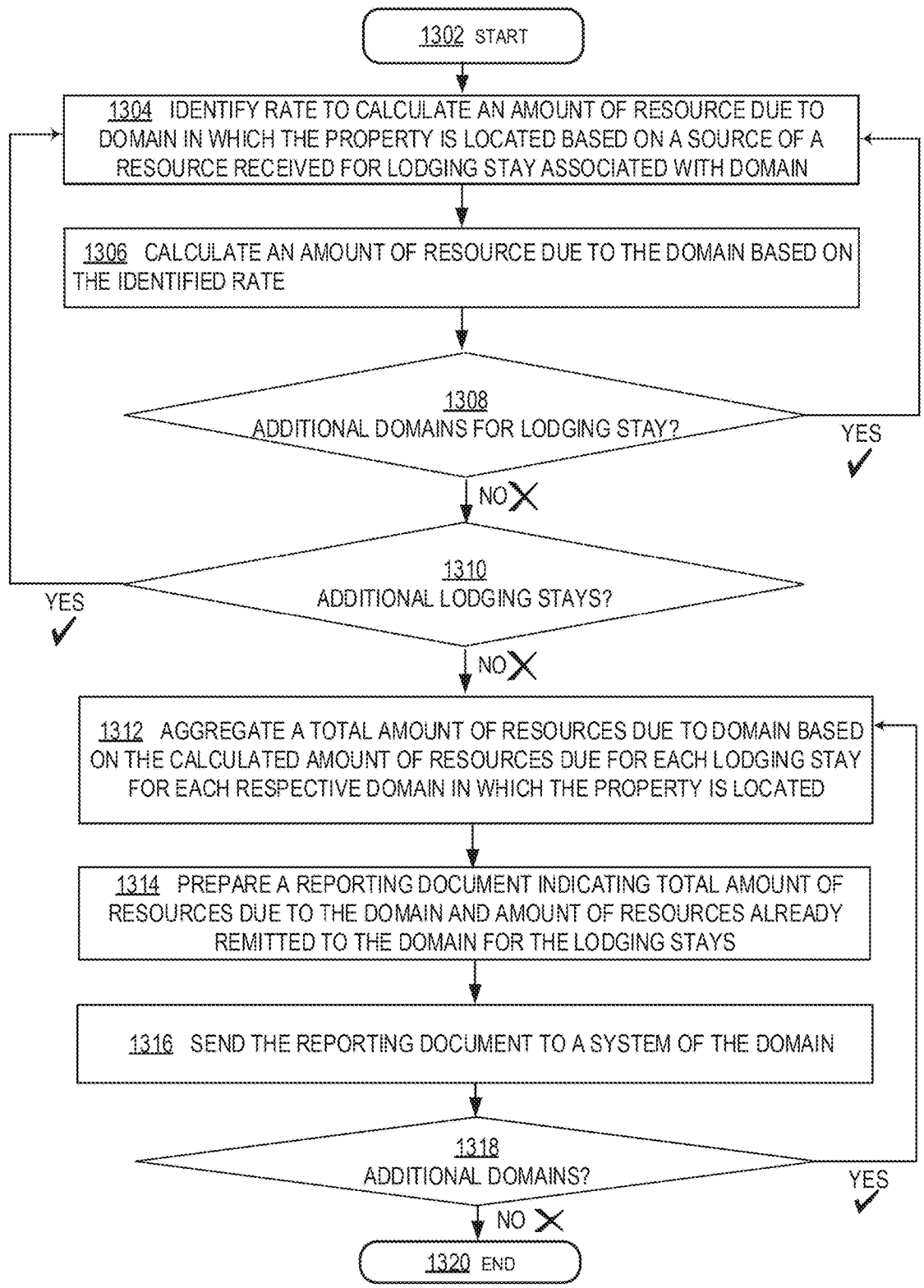
FIG. 13 is a flowchart for describing operational examples and a use cases of embodiments that are improvements in automated computerized systems.

FIG. 13 is a flowchart for describing operational examples and use cases of embodiments that are improvements in automated computerized systems. In particular, shown is a method 1300 for facilitating remitting resources for lodging stays. In method 1300 a plurality of relationship instances are transactions of a plurality of lodging stays on one or more respective properties and each property of the plurality of respective properties is located in one or more respective domains (e.g., tax jurisdictions) of a plurality of domains.

The sample method starts at 1302.

At 1304, the OSP 598 electronically identifies a rate to calculate an amount of resource due to the respective domain in which the respective property is located based on a source of a resource received for the lodging stay associated with the respective domain.

At 1306, the OSP 598 calculates an amount of resource due to the respective domain based on the identified rate.

At 1308, the OSP 598 determines whether there are additional domains for the lodging stay at the respective property. For example, the respective property may be located in multiples domains (e.g., tax jurisdictions). If it is determined there are additional domains for the lodging stay at the respective property, the method 1300 proceeds back to 1304 to identify the rate to calculate an amount of resource due to the additional domain and then calculate an amount of resources due to the additional domain for the lodging stay. If it is determined there are no additional domains for the lodging stay at the respective property, then the method 1300 proceeds to 1310.

At 1310, the OSP 598 determines whether there are additional lodging stays to process. If it is determined there are additional lodging stays to process, the method 1300 proceeds back to 1304 to identify the rate to calculate an amount of resource due to the respective domain for the additional lodging stay and then calculate an amount of resources due to the respective domain for the additional lodging stay. If it is determined there are no additional lodging stays to process, then the method 1300 proceeds to 1312.

At 312, the OSP 598 aggregates a total amount of resources due to the domain based on the calculated amount of resources due for each lodging stay for each respective domain in which the respective property is located.

At 314, the OSP 598 electronically prepares a reporting document indicating the total amount of resources due to the domain and an amount of resources already remitted to the domain for one or more of the plurality of lodging stays.

At 316, the OSP 598 electronically sends, via computer network 188, the reporting document to a system of the domain.

At 318, the OSP 598 determines whether there are additional domains to process of the plurality of domains. If it is determined there are additional domains to process of the plurality of domains, the method 1300 proceeds back to 1312 to aggregate a total amount of resources due for each lodging stay for the additional domain, prepare the applicable reporting document and then send the reporting document to the system of the additional domain. If it is determined there are no additional domains to process of the plurality of domains, then the method 1300 ends at 1320.

In various embodiments, the method 1300 is implemented by the tax engine 583 of the OSP 598 executing software code based on digital tax rules 570.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C #, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, including:
   electronically obtaining, by an online service platform including a computer system, from one or more remote devices over a packet-switched network, data regarding a plurality of sources and corresponding amounts of resources received from the plurality of sources for a plurality of relationship instances each associated with one or more respective domains of a plurality of domains;
   for each relationship instance of the plurality of relationship instances:
      electronically identifying, by the computer system, a rate to calculate an amount of resource due to one or more respective domains associated with the relationship instance based on a source of a resource received for the relationship instance and the one or more respective domains;
      electronically publishing, by the computer system, the rate identification to a secure electronic ledger system using a cryptographic hash or protocol, and that is accessible by a respective system of the one or more respective domains and respective systems of one or more entities involved in the relationship instance; and
      calculating, by the computer system, an amount of resources due to at least one respective domain associated with the relationship instance based on the identified rate; and
   for each domain of the plurality of domains:
      aggregating, by the computer system, a total amount of resources due to the domain based on the calculated amount of resources due for each relationship instance associated with the domain;
      electronically preparing, by the computer system, a reporting document indicating the total amount of resources due to the domain and an amount of resources already remitted to the domain for the plurality relationship instances; and
      electronically sending, by the computer system, via a computer network including the packet-switched network, the reporting document to a system of the domain.

2. The method of claim 1 in which the plurality of relationship instances are transactions of a plurality of lodging stays on one or more respective properties and the association with one or more respective domains is that each property of the plurality of respective properties is located in one or more respective domains of the plurality of domains, and further including:
   for each lodging stay of the plurality of lodging stays:
      for each respective domain in which the respective property is located:
         electronically identifying, by the computer system, a rate to calculate an amount of resource due to the respective domain in which the respective property is located based on a source of a resource received for the lodging stay associated with the respective domain; and
         calculating, by the computer system, an amount of resource due to the respective domain based on the identified rate; and
   for each domain of the plurality of domains:
      aggregating, by the computer system, a total amount of resources due to the domain based on the calculated amount of resources due for each lodging stay for each respective domain in which the respective property is located;
      electronically preparing, by the computer system, a reporting document indicating the total amount of resources due to the domain and an amount of resources already remitted to the domain for one or more of the plurality of lodging stays; and electronically sending, by the computer system, via a computer network, the reporting document to a system of the domain.

3. The method of claim 2, further including:

for each domain of the plurality of domains:

after electronically sending the reporting document to the domain, electronically remitting, by the computer system, a balance of resources due to the domain based on the amount of resources already remitted to the domain subtracted from the total amount of resources due to the domain.

4. The method of claim 2, in which the electronically identifying the rate to calculate the amount of resource due to the respective domain in which the respective property is located includes:

determining a type of the source of the resource received for the lodging stay;

determining whether the determined type of source is associated with the respective domain in a database that includes tax rates for the respective domain;

selecting the database based on a determination that the determined type of source is associated with the respective domain; and identifying in the database the rate to calculate the amount of resource due to the respective domain for the lodging stay.

5. The method of claim 4, in which the determining the type of source includes:

electronically extracting, from the data regarding the plurality of sources, a unique identifier associated with the lodging stay; and determining, based on the unique identifier, whether the source of the resource received for the lodging stay is associated with a voluntary tax collection agreement with the one or more respective domains.

6. The method of claim 4, in which the determining the type of source includes:

electronically extracting, from the data regarding the plurality of sources, a unique identifier associated with the lodging stay; and determining, based on the unique identifier, that the source of the resource received for the lodging stay is not associated with a voluntary tax collection agreement with the one or more respective domains.

7. The method of claim 6, in which the source of the resource received for the lodging stay that is not associated with a voluntary tax collection agreement is a direct booking with an owner of the respective property.

8. The method of claim 2, further including:

electronically publishing, by the computer system, the rate identification to the secure electronic ledger system using the cryptographic hash or protocol, and that is accessible by a respective system of each domain and respective systems of one or more entities involved in the plurality of transactions.

9. The method of claim 2, further including:

electronically publishing, by the computer system, the calculation of the amount of resource due for each domain for each lodging stay to the secure electronic ledger system using the cryptographic hash or protocol, in which the secure electronic ledger system is accessible by a respective system of each domain and respective systems of one or more entities involved in the plurality of transactions.

10. The method of claim 2, further including:

electronically publishing, by the computer system, the aggregation of the total amount of resources due for each domain to the secure electronic ledger system using the cryptographic hash or protocol, in which the secure electronic ledger system is accessible by a respective system of each domain and respective systems of one or more entities involved in the plurality of transactions.

11. The method of claim 2, further including:

electronically publishing, by the computer system, the preparation and sending of the reporting document to the secure electronic ledger system using the cryptographic hash or protocol, in which the secure electronic ledger system is accessible by a respective system of each domain and systems of one or more entities involved in the plurality of transactions.

12. The method of claim 2, further including:

electronically publishing, by the computer system, the electronic remittance of the balance of resources due for each domain to the secure electronic ledger system using the cryptographic hash or protocol, in which the secure electronic ledger system is accessible by a respective system of each domain and respective systems of one or more entities involved in the plurality of transactions.

* * * * *